(12) United States Patent
Yamamoto et al.

(10) Patent No.: US 7,867,585 B2
(45) Date of Patent: Jan. 11, 2011

(54) SUPPORT FOR IMAGE RECORDING MATERIAL AND IMAGE RECORDING MATERIAL

(75) Inventors: Hiroshi Yamamoto, Shizuoka (JP); Shinichi Teramae, Kanagawa (JP); Kubota Yutaka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 205 days.

(21) Appl. No.: 11/883,649

(22) PCT Filed: Feb. 3, 2006

(86) PCT No.: PCT/JP2006/302286
§ 371 (c)(1),
(2), (4) Date: Aug. 3, 2007

(87) PCT Pub. No.: WO2006/095228
PCT Pub. Date: Sep. 14, 2006

(65) Prior Publication Data
US 2008/0118676 A1 May 22, 2008

(30) Foreign Application Priority Data
Feb. 4, 2005 (JP) .................. 2005-029790
Nov. 9, 2005 (JP) .................. 2005-325029

(51) Int. Cl.
*B41B 5/00* (2006.01)
(52) U.S. Cl. .......... 428/32.18; 428/32.2; 428/32.21; 428/32.26; 428/32.27; 428/32.28; 428/32.3; 428/32.34
(58) Field of Classification Search .......... 428/32.18, 428/32.2, 32.21, 32.26, 32.27, 32.28, 32.3, 428/32.34
See application file for complete search history.

(56) References Cited
U.S. PATENT DOCUMENTS
2003/0064208 A1 * 4/2003 Yamada et al. ............ 428/195
2003/0198885 A1  10/2003 Tamagawa
2004/0185193 A1 * 9/2004 Taka et al. .............. 428/32.18
2004/0265513 A1  12/2004 Tamagawa
2005/0020448 A1 * 1/2005 Tamagawa et al. .......... 503/227

FOREIGN PATENT DOCUMENTS

| JP | 55-51583 A | 4/1980 |
|---|---|---|
| JP | 56-157 A | 1/1981 |
| JP | 57-107879 A | 7/1982 |
| JP | 57-107880 A | 7/1982 |
| JP | 59-230787 A | 12/1984 |
| JP | 62-160277 A | 7/1987 |
| JP | 62-183382 A | 8/1987 |
| JP | 62-184879 A | 8/1987 |
| JP | 64-11877 A | 1/1989 |
| JP | 2-113986 A | 4/1990 |
| JP | 2-274587 A | 11/1990 |
| JP | 2000-351270 A | 12/2000 |
| JP | 2001-63205 A | 3/2001 |
| JP | 2001-96898 A | 4/2001 |
| JP | 2001-270232 A | 10/2001 |
| JP | 2004-3078 A | 1/2004 |
| JP | 2004-226951 A | 8/2004 |
| JP | 2004-245980 A | 9/2004 |

OTHER PUBLICATIONS

Kozo Nagata, et al., Development of High Image Quality Inkjet Printing Paper Kassai "Shashin-Shiage Pro", Fujifilm Research & Development, Nov. 30, 2005, pp. 19-24, No. 51-2006.

* cited by examiner

*Primary Examiner*—Betelhem Shewareged
(74) *Attorney, Agent, or Firm*—Sughrue Mion, PLLC

(57) ABSTRACT

A support for image recording material, comprising a base paper and thermoplastic resin layers formed on both faces of the base paper, wherein: a formation index of the base paper is 60 or more; a surface of the base paper, at least on a side where an image recording layer is formed, has a center surface average roughness SRa of 0.70 μm or less when measured with a cut-off condition of within the range of 0.05 to 0.5 mm, and a center surface average roughness SRa of 0.80 μm or less when measured with a cut-off condition of within the range of 1 to 3 mm; and the thickness of the thermoplastic resin layer, at least on the side where the image recording layer is formed, is 35 to 60 μm.

7 Claims, 5 Drawing Sheets

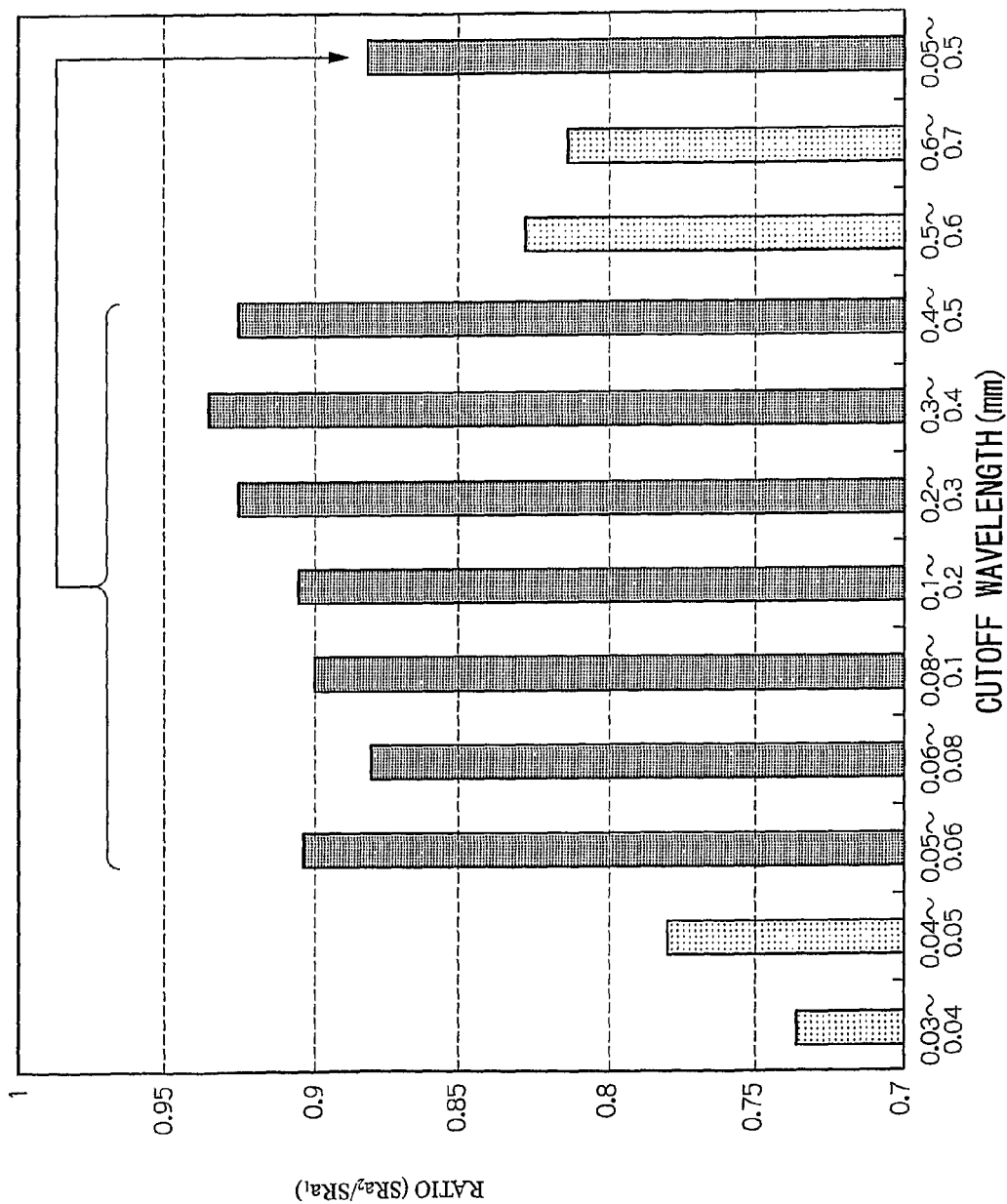

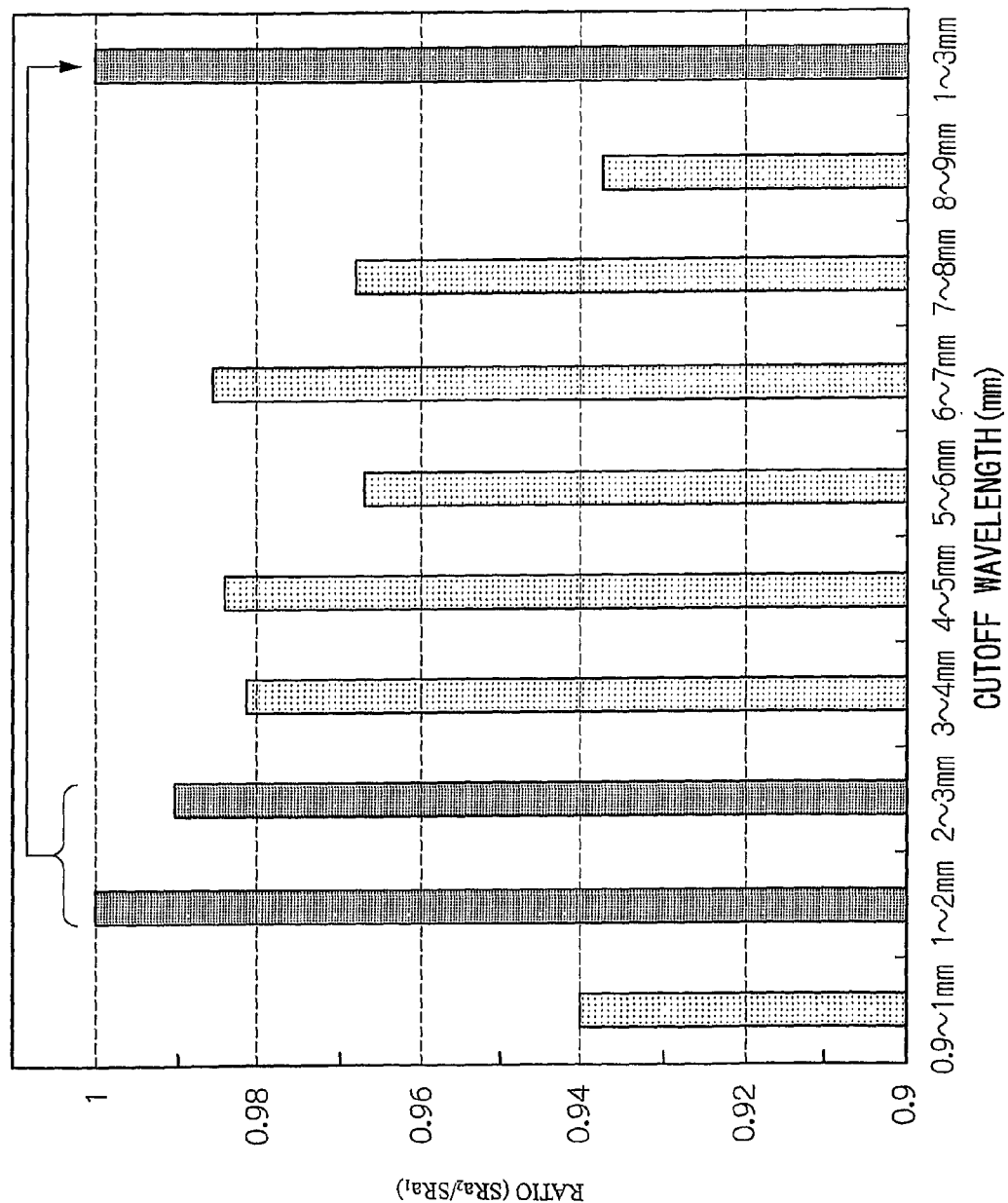

SUPPORT FOR IMAGE RECORDING MATERIAL AND IMAGE RECORDING MATERIAL

TECHNICAL FIELD

The present invention relates to a support for image recording material and an image recording material using the same, and specifically, to an image recording material favorable for use in recording high-quality photograph-like images (for example, photographic glossy paper) and a support for image recording material favorably used in the image recording material.

BACKGROUND ART

In recent rapid progress of the information industry, various information processing systems have been developed, and various recording methods and devices suitable for use in these information-processing systems have also been developed and put to practical use.

Examples of the commercialized recording processes include silver photographic, electrophotographic, inkjet recording, thermal recording, sublimation transfer, and thermal transfer processes, and the like. It has been desired high quality image having high surface gloss in addition to image sharpness and vivid hue toward all of the above recording processes.

Among the above recording processes, inkjet recording process, for example, has been widely used not only in offices but also in homes, because the inkjet process allows printing on various recording materials and the hardware (devices) thereof is relatively cheaper, more compact, and more silent. In addition, in the recent trend of inkjet printers toward higher-resolution and in the progress of the hardware (devices), a variety of media for inkjet recording has been developed, and more recently, there are some inkjet printers available that allow printing of so-called photograph-like high-quality images.

Examples of the inkjet recording media are disclosed, for example, in Japanese Patent Application Laid-Open (JP-A) Nos. 55-51583, 56-157, 57-107879, 57-107880, 59-230787, 62-160277, 62-184879, 62-183382, and 64-11877, and recording materials prepared by coating a silicon-containing pigment such as silica and a water-based binder on a paper substrate are known. In addition, the inkjet recording media prepared by coating after treatment with an aqueous solution containing a cationic polyelectrolyte, as described, for example, in JP-A No. 2-113986, and those prepared by coating after treatment with an aqueous solution containing colloidal silica and a cationic polyelectrolyte, as described in JP-A No. 2-274587, are proposed as ink-jet recording materials given with glossiness.

The support for the recording material commonly used has been paper, and the paper has function as an ink absorbing layer. However it has been recently requested a photograph-like recording material having a texture similar to that of silver photographic printing paper. Because the recording materials having paper support have problems in glossiness, texture, water resistance, cockling after recording (wrinkle or waviness), and others, resin-laminated papers having the layers of a polyolefin resin such as polyethylene on both faces of the paper (polyolefin resin-coated papers) have been used widely, such as those described in JP-A Nos. 13-270232, 13-96898, 13-63205, 12-351270, 12-522649 and the like.

Such polyolefin resin-coated papers are generally used as silver photographic printing papers, and are better in photographic texture such as touch and strength than synthetic films, typified by polyethylene terephthalate.

DISCLOSURE OF INVENTION

As described above, polyolefin resin-coated papers are preferable as the recording materials allowing recording of photograph-like image, but, if the base paper has inferior formation, i.e., if there is small fluctuation in the distribution of its basis weight, there is greater variation generated in the size of the voids between the fibers in paper, and consequently, the resin-coated paper having a thermoplastic resin layer or the image recording medium from the resin-coated paper having an additional image recording layer has a surface condition and a feel significantly deteriorated under its influence, when prepared. Thus, there still remained the problem that it was not always possible to obtain a high-quality image having a photographic feel.

The present invention has been made in view of the above circumstances and provides a support for image recording material having better formation, surface smoothness and photographic feel and allowing recording of a high-quality image, and a high-glossiness and high-smoothness image recording material having a photographic feel and allowing formation of a high-quality image.

A first aspect of the present invention is a support for image recording material, comprising a base paper and thermoplastic resin layers formed on both faces of the base paper, wherein:

a formation index of the base paper is 60 or more;

a surface of the base paper, at least on a side where an image recording layer is formed, has a center surface average roughness SRa of 0.70 μm or less when measured with a cut-off condition of within the range of 0.05 to 0.5 mm, and a center surface average roughness SRa of 0.80 μm or less when measured with a cut-off condition of within the range of 1 to 3 mm; and the thickness of the thermoplastic resin layer, at least on the side where the image recording layer is formed, is 35 to 60 μm.

A second aspect of the present invention is a support for image recording material according to the first aspect, wherein the thermoplastic resin layer on the side where an image recording layer is formed is laminated by melt-extruding a polyolefin resin onto the base paper and then feeding the base paper between an elastic roll and a cooling roll at a nip pressure of 2 MPa or more.

A third aspect of the present invention is an image recording material comprising the support for image recording material according to the first aspect or second aspect and an image recording layer which is formed at least on one face of the support for image recording material.

A fourth aspect of the present invention is the image recording material according to the third aspect, wherein the image recording layer is an ink receiving layer for receiving inkjet recording ink.

A fifth aspect of the present invention is the image recording material according to the fourth aspect, wherein the ink receiving layer contains fine particles, a water soluble resin, a crosslinking agent that can crosslink the water soluble resin, and a mordant.

A sixth aspect of the present invention is the image recording material according to the fifth aspect, wherein:

the water soluble resin is at least one kind selected from the group consisting of polyvinylalcohol resins, cellulosic resins, ether bond-containing resins, carbamoyl group-containing resins, carboxyl group-containing resins, and gelatins; and the fine particles are at least one kind selected from the group consisting of silica fine particles, colloidal silica fine particles, alumina fine particles, and pseudoboehmite fine particles.

A seventh aspect of the present invention is the image recording material according to any one of the fourth aspect to sixth aspect, wherein:

the ink receiving layer is a layer obtained by crosslinking and hardening a coating layer formed by coating a coating solution containing at least fine particles and a water soluble resin; and the crosslinking and hardening is performed by adding a crosslinking agent to the coating solution and/or a basic solution having pH of 7.1 or more and applying the basic solution onto the coating layer during the following period (1) or (2), (1) simultaneously with the coating of the coating solution to form the coated layer, or (2) during drying of the coated layer before the coated layer exhibits a reduced rate of drying.

BRIEF DESCRIPTION OF DRAWINGS

FIG. 4 is a graph showing the correlation with $SRa_2$ of the image recording material surface and $SRa_1$ of the base paper surface at the cut off wavelength within the range of 0.03 to 0.7 mm.

FIG. 5 is a graph showing the correlation with $SRa_2$ of the image recording material surface and $SRa_1$ of the base paper surface at the cut off wavelength within the range of 0.9 to 3 mm.

BEST MODE FOR CARRYING OUT THE INVENTION

Figure 1:
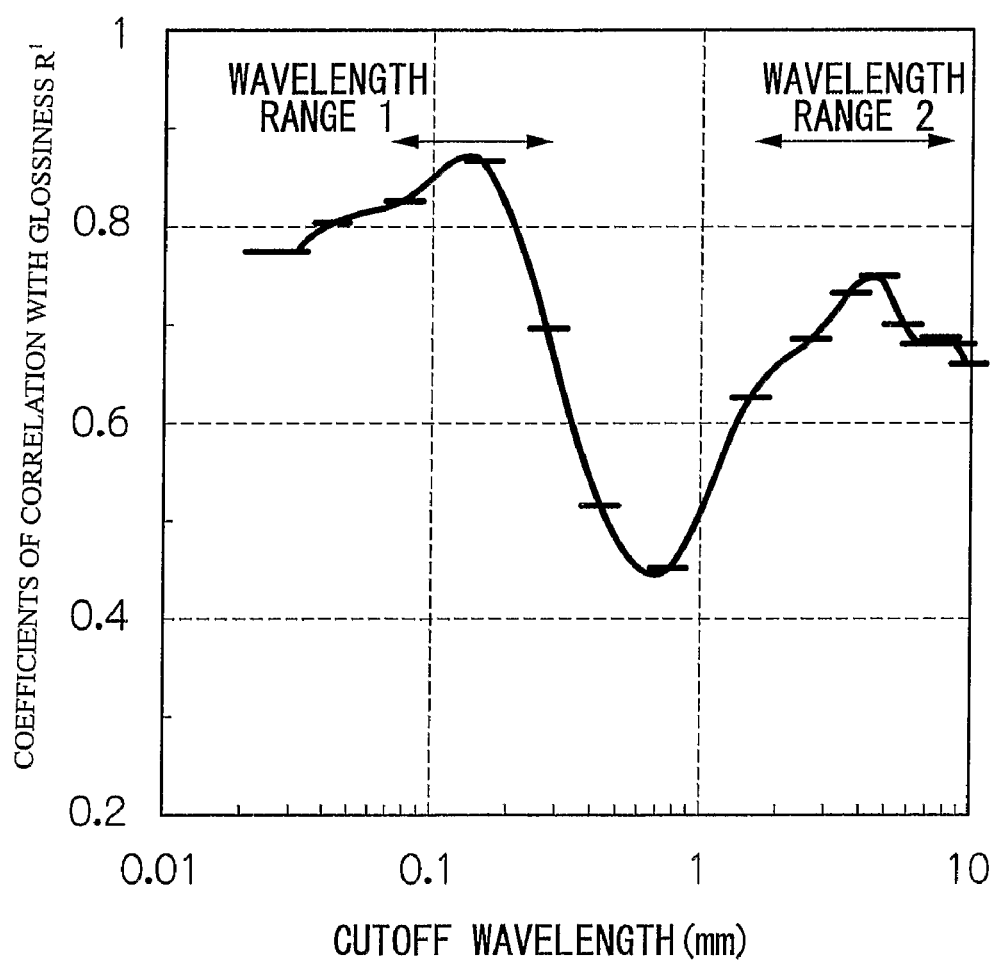
FIG. 1 is a graph showing coefficients of correlation $R^1$ with respect to the cut-off wavelengths.

Hereinafter, the support for image recording material according to the present invention and the image recording material having this present support for image recording material will be described in detail.

—Support for Image Recording Material—

The support for image recording material according to the present invention comprises a base paper and thermoplastic resin layers formed on the both surfaces of the base paper; and an image recording layer allowing image recording, when formed on the thermoplastic resin layer, give a high-quality image having a photographic feel or a so-called high-quality photograph-like image. The thermoplastic resin layer may be formed partially or entirely on one side or both side surfaces of the base paper.

The base paper constituting the support for image recording material according to the present invention is a paper having a formation index of 60 or more. A higher formation index means superior formation. With a formation index within the range above, it is possible to suppress the formation unevenness, uniform and heighten the smoothness, and improve the apparent surface properties and the photographic feel in the present invention.

In other words, when a formation index is less than 60, the formation unevenness increase significantly, and then planarity and photographic feel deteriorate. As a result, the image recording material formed is less effective in forming a photograph-like high-quality image. More preferably, the formation index is 70 or more.

The formation index is determined by using a 3D sheet analyzer (M/K950) manufactured by M/K Systems, Inc. (MKS) under its aperture of a diameter of 1.5 mm, and additionally using a formation tester (MFT).

Specifically, local difference in basis weight in a sample is determined as a difference in light intensity, by placing the sample on a rotating drum of the 3D sheet analyzer, and measuring the light transmittance of the sample by using a light source placed on the drum shaft and a photodetector placed outside the drum at the position corresponding to the light source. The area of the measurement is determined by an aperture placed in the light inlet region of the photodetector. Then, the differences in light intensity (deviations) thus obtained are then amplified and A/D converted, and classified into 64 optical basis weight classes; 100,000 pieces of data are obtained in one scanning; and its histogram frequency distribution thereof is obtained. The formation index is calculated by dividing the maximum frequency in the histogram (peak value) in the 64 classes respectively corresponding to micro basis weight ranges by the number of the classes having a frequency of 100 or more and multiplying the value by $\frac{1}{100}$.

The formation index can be increased, in other words formation of the base paper can be improved, by properly modifying, for example, the pulp composition of base paper, beating condition, kinds and addition amounts of filler, paper strength additive, internal sizing agent, surface-sizing agent, surface treatment agent, formation controlling additive, filtration aid and the like, papermaking concentration, slice opening of head box, wire mesh, the Jet/Wire ratio of paper machine (the ratio of stock jet speed to wire speed during papermaking), wire shaking condition, dandy roll condition, smoother pressurization condition, press pressurization condition, press draw condition, drying temperature condition, the kind and condition of calendering, and the like; and mainly by preventing flocculation of the raw materials. However, the method is not limited thereto.

The base paper according to the present invention is obtained by sheeting a pulp stock prepared by beating a desirable pulp, and in particular, by sheeting a pulp slurry beaten and adjusted. The sheeting step in papermaking include a step of pressing the web face of base paper, which corresponds to the face where a recording layer is formed, for example, by coating, onto a drum-dryer cylinder with a dryer canvas and drying the web, wherein the web can be dried at a tensile force of the dryer canvas adjusted into the range of 1.5 to 3 kg/cm.

The pulp is not particularly limited, and may be selected from natural pulps of needle-leaved woods, broadleaf woods, and the like, including LBKP (broadleaf-wood bleached Kraft pulps) such as of aspen, acacia, maple, poplar, and eucalyptus; NBKP (needle-leaved wood bleached Kraft pulp) such as of spruce and Douglas fir; LBSP, NBSP, LDP, NDP, LUKP, NUKP. These pulps may be used alone or in combination of two or more as arbitrarily selected.

The pulp for base paper preferably contains a maple Kraft pulp (maple LBKP) in an amount of 30 wt % or more and more preferably 50 wt % or more. A maple LBKP blending rate of 30 wt % or more in pulp improves the smoothness and also the glossiness of the support is improved further.

The method of producing, for example, a Kraft pulp (LBKP) is not particularly limited, and may be used commonly-practiced methods of producing Kraft pulp. The Kraft pulp is first beaten to a water-retention percentage within a predetermined range; the pulp slurry is adjusted by adding a sizing agent or others as needed; and then the adjusted pulp slurry is sheeted. When a mixed pulp containing several kinds of pulps is desirable, a Kraft pulp is beaten and adjusted, and another pulp is beaten and adjusted, and then their pulps are mixed.

In sheeting, the freeness of the beaten LBKP is preferably 200 to 400 ml by Canadian Standard Freeness (C.S.F). A pulp having freeness in the range gives a web having a smaller swelling/shrinkage ratio and a favorable planarity (surface smoothness). The freeness is a value determined according to the Canadian standard test method described in JIS-P8121, "Test Method of determining Pulp Freeness".

In addition, the water-retention percentage after beating is preferably 100 to 200%. When the water-retention percentage of the pulp in the pulp stock for sheeting after beating is in the range above, it is possible to obtain a pulp having a smaller swelling/shrinkage ratio, a high-glossiness, and smooth-surfaced paper fewer in irregularity.

The water-retention percentage is a value determined according to the paper pulp test method No. 26:2000 (Method of Water-Retention test of Pulp) specified by JAPAN TAPPI. Specifically, it is determined by dewatering a pulp suspension by centrifugal force and measuring the water-retention percentage of the dewatered pulp, and more specifically, by filtering a beaten pulp suspension in a suitable filtration container called centrifugal cup, centrifuging the container in a precipitation tube of centrifugal separator under a particular condition for a particular period of time, and weighing the centrifuged dewatered wet pulp. The centrifuged and dewatered wet pulp is then dried at 105° C. to absolutely dryness. When the weight of the centrifuged and dewatered wet pulp is designated as A and the weight of the absolutely dry pulp is designated as B, the water-retention percentage is calculated by the following Formula:

Water-Retention Percentage (%)=$(A-B)/B \times 100$.

A pulp containing fewer impurities is preferable as the pulp, and a pulp improved in brightness by bleaching (bleached pulp) is also useful.

In particular, the pulp is preferably a bleached broadleaf-wood Kraft pulp (bleached LBKP) improved in brightness, from the points of trashes and hue; and use of at least one bleached broadleaf-wood Kraft pulp (bleached LBKP) selected from those of aspen, acacia, maple, and poplar is particularly preferable. These bleached LBKP's may be used alone or as a mixed pulp of two or more bleached LBKP's, or as a mixed pulp of one or more bleached LBKP's and one or more of the pulps other than the bleached LBKP's.

The content of the pulp in the base paper according to the present invention, i.e., solid content in the pulp stock for preparation of base paper, is preferably 60 wt % or more and more preferably 80 wt % or more.

The pulp stock before sheeting may contain anionic colloidal silica additionally. Thus, the base paper according to the present invention is preferably prepared after addition of anionic colloidal silica. Presence of the anionic colloidal silica is effective in improving dewatering efficiency (by functioning as a filter aid), and in particular, in improving the sharpness of cutting or cutting efficiency.

The specific surface area of the anionic colloidal silica is preferably within the range of 100 to 1,000 m$^2$/g; and the average particle diameter is preferably within the range of 1 to 20 nm.

The content of the anionic colloidal silica, if included, is preferably 0.005 to 0.5 wt % and more preferably 0.01 to 0.2 wt % with respect to the amount of the pulp according to the present invention, in point of improvement in the cutting and dewatering efficiencies above.

The paper machine used for sheeting the pulp stock is not particularly limited and may be selected appropriately from known paper machines. An example thereof is a Fourdrinier machine equipped with a shaking device having a shaking width of 10 mm or more, and a paper machine having a dandy roll (e.g., paper machine having a dandy roll of 60- to 100-mesh wire) is preferable for improvement in planarity.

The Jet/Wire ratio of the paper machine (ratio of stock jet speed to wire speed during papermaking) is preferably not too high or low, and preferably 0.80 or more and 1.15 or less and more preferably 0.85 or more and 1.10 or less. A low paper-making concentration, i.e., a low pulp-slurry concentration, often causes dewatering irregularity, while a high pulp-slurry concentration leads to flocculation of the raw materials; and thus both cases caused deterioration in formation. The pulp slurry concentration is preferably 0.6% or more and 1.3% or less, and more preferably 0.7% or more and 1.2% or less.

The base paper according to the present invention is a natural pulp paper using a common natural pulp as the primary component, and may be appropriately added a filler such as fine particles of clay, talc, calcium carbonate, or a urea resin; a sizing agent such as rosin, alkylketene dimer, higher fatty acid salt, paraffin wax, or alkenylsuccinic acid; a paper-strength enhancer such as starch, polyacrylamide, or polyvinylalcohol; a moisturizing agent such as polyethylene glycols; a fixing agent such as aluminum sulfate and the like as needed additives. In addition, other additives may be added like a white pigment such as titanium oxide, a fluorescent dye, a slime-controlling agent, an antifoaming agent, and a softener such as quaternary ammonium and so on.

The surface of the base paper of natural pulp paper may be applied surface sizing treatment, for example, with a film-forming polymer such as gelatin, starch, carboxymethylcellulose, polyacrylamide, polyvinylalcohol, or a modified polyvinylalcohol. Examples of the modified polyvinylalcohols include carboxyl group-modified polyvinylalcohols, silanol-modified polyvinylalcohols, copolymers with acrylamide, and the like. The amount of the film-forming polymer coated when the base paper applied surface sizing treatment with the film-forming property polymer is preferably adjusted to 0.1 to 5.0 g/m$^2$ and more preferably to 0.5 to 2.0 g/m$^2$. The film-forming polymer may contain an antistatic agent, a fluorescent brightener, pigment, an antifoaming agent, or the like as needed.

The base paper normally has a water content of approximately 7.0 wt %. However, in the present invention, it is preferably 7.5 to 10 wt %, more preferably 8.0 to 10 wt % in consideration with the formation of the base paper.

The thickness of the base paper is not particularly limited and preferably 150 to 250 μm; and the basis weight of the base paper is preferably 150 to 250 g/m$^2$ and particularly preferably 180 to 220 g/m$^2$.

The base paper according to the present invention preferably is a paper superior in surface smoothness and planarity, on account of application for products that demand planarity such as photographic printing paper, and thus, may be surface-treated under heat and pressure by calendering such as machine calendering or super calendering during or after papermaking.

The density of the base paper is generally 0.7 to 1.2 g/m$^2$ (JIS P-8118). In addition, the stiffness of the base paper determined according to JIS P-8125 (2000) is preferably 1.0 to 3.0 mNm in MD (machine direction) and 0.5 to 1.5 mNm in CD (crosswise direction).

A surface-sizing agent may be applied on the surface of the base paper. Examples of the surface-sizing agents are the same as those that can be added to the base paper above. The pH of the base paper is preferably 5 to 9, as a value determined in the hot-water extraction method specified by JIS P-8113.

The support for image recording material according to the present invention has a base paper and thermoplastic resin layers formed on at least portion of both surfaces of the base paper (i.e., front and rear faces). The center surface average roughness (SRa) of the face of the base paper carrying the thermoplastic resin layers where an image recording layer is formed in preparation of the image recording material, or of both faces thereof, is 0.70 µm or less when measured under the condition of a cut-off of 0.05 to 0.5 nun and 0.80 µm or less when determined under the condition of a cut-off of 1 to 3 mm.

The center surface average roughness (SRa) is an indicator of the smoothness of base paper surface (surface smoothness), and when the center surface average roughness SRa is outside the above range, the image recording material using the base paper can not get preferable glossiness or a surface smoothness for forming a photograph-like image.

In other words, specifically if the SRa as determined under the condition of a cut-off of 0.05 to 0.5 mm is more than 0.70 µm, the image of the image recording material using base paper becomes blurred, for example, due to reflection of the light from fluorescent lamp, and the clarity of image deteriorates because the clarity of image considerably controls by the glossiness of paper. Alternatively if the SRa as determined under the condition of a cut-off of 1 to 3 mm is more than 0.80 µm, the image of the image recording material using base paper distorts, for example, due to reflection of the light from fluorescent lamp, and the clarity of image deteriorates because the clarity of image considerably controls by the glossiness of paper.

The image clarity is an indicator of the definition of image quantifying the degree of image distortion, and, for example, determined according to the image-clarity test method specified by JIS H8686-2 by using an image clarity meter ICM-1 (manufactured by Suga Test Instrument Co., Ltd.) with a desired optical comb (2.0 mm, 1.0 mm, 0.5 mm, or the like). The test sample used then is a black painted image after recording.

The reason for setting cut-off wavelengths at 0.05 to 0.5 mm and 1 to 3 mm as the measurement conditions for SRa will be explained.

In the present invention, to obtain an image recording material which can form a high quality image having high glossiness and photographic texture, evaluation was performed by evaluators carrying out visual observation and scoring with respect to the items of "glossy feeling", "blur" and "distortion" and obtaining average values therefor. At this time, image recording materials in which the SRa of base paper surfaces thereof was different were prepared, and SRa was measured for each of the image recording materials while rounding the cut-off wavelength to the nearest 0.01 mm for the range of 0.02 to 0.10 mm, to the nearest 0.1 mm for the range of 0.1 to 1.0 mm, and to the nearest 1 mm for the range of 1 to 9 mm.

Based on this data, a "coefficient of correlation with glossiness $R^1$" was obtained as the coefficient of correlation between score with glossiness and SRa under each range of cut-off wavelength. A "coefficient of correlation with blur $R^2$" was obtained as the coefficient of correlation between score with blur and SRa under each range of cut-off wavelength. A "coefficient of correlation with distortion $R^3$" was obtained as the coefficient of correlation between score with distortion and SRa under each range of cut-off wavelength.

Figure 2:
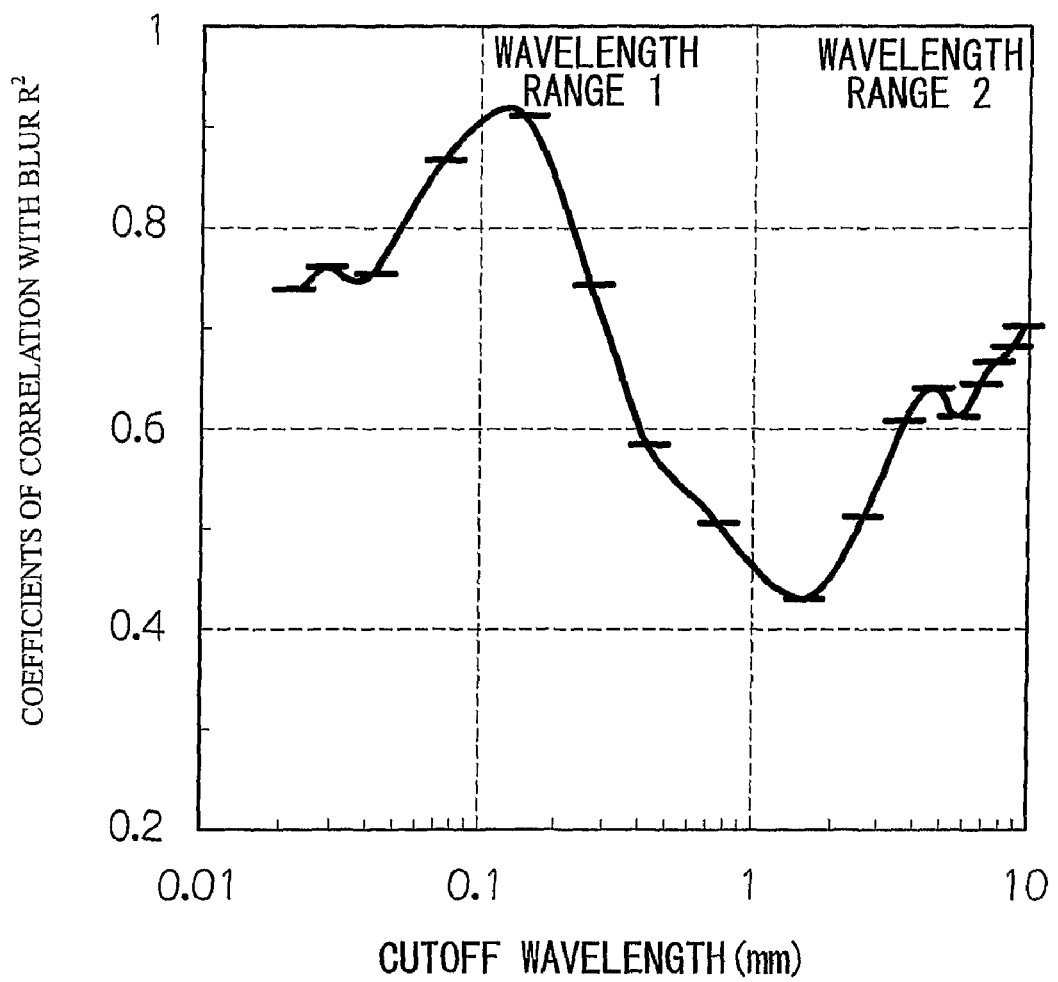
FIG. 2 is a graph showing coefficients of correlation $R^2$ with respect to the cut-off wavelengths.
Figure 3:
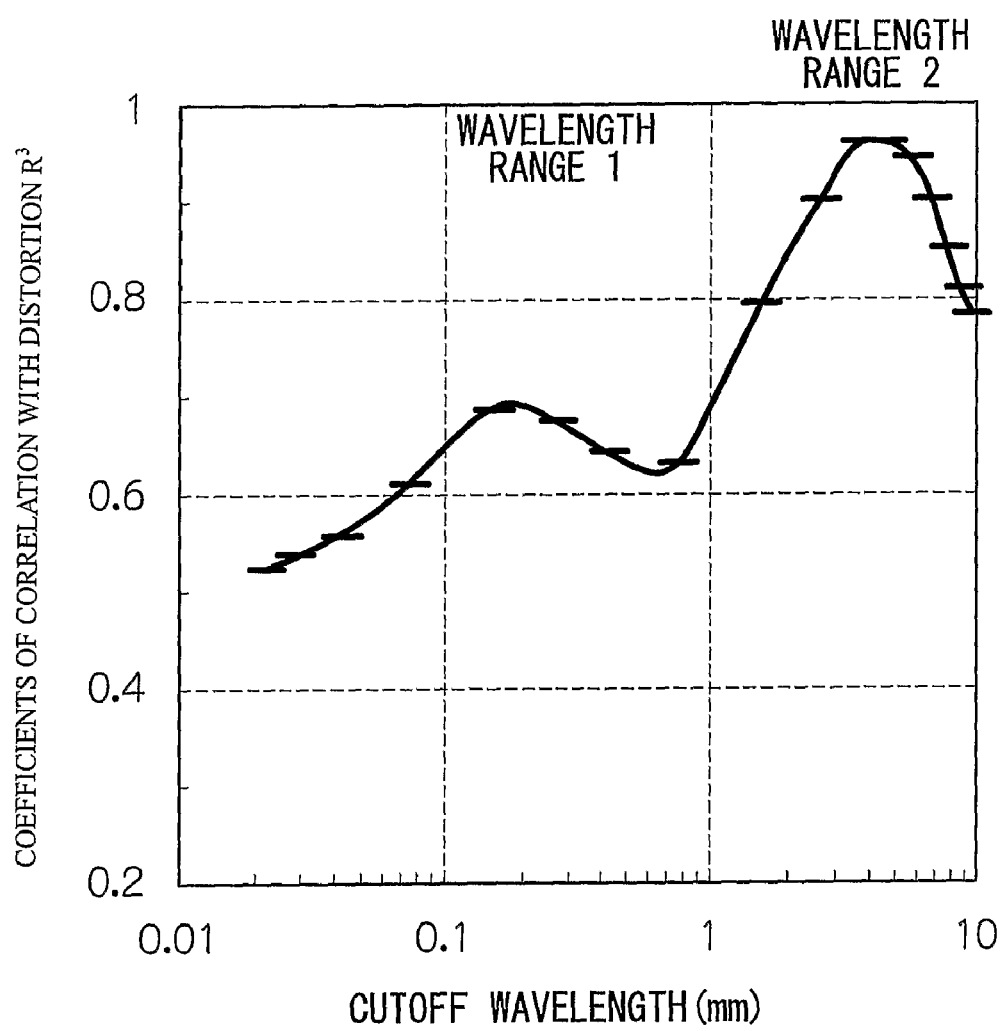
FIG. 3 is a graph showing coefficients of correlation $R^3$ with respect to the cut-off wavelengths.

Each of coefficients of correlation $R^1$, $R^2$ and $R^3$ with respect to the cut-off wavelengths are shown in the graphs in FIGS. 1-3.

From the results in FIGS. 1-3, it is understood that, at a cut-off wavelength of 0.05 to 0.5 mm, there is a strong correlation with regard to glossiness and blur, and that, at a cut-off wavelength of 1 to 3 mm, there is a strong correlation with regard to glossiness and distortion.

Further, examination was carried out with regard to the correlation with $SRa_2$ of the image recording material surface and $SRa_1$ of the base paper surface to obtain the graphs in FIGS. 4 and 5. In the graphs in FIGS. 4 and 5, the cut-off wavelength is shown on the horizontal axis, and the ratio of $SRa_2$ of the image recording material surface with respect to $SRa_1$ of the base paper surface ($SRa_2/SRa_1$) is shown on the vertical axis.

From FIGS. 4 and 5, it is understood that in the region where the cut-off wavelength is 0.05 to 0.5 mm and the region where the cut-off wavelength is 1 to 3 mm, $SRa_2$ of the image recording material surface has a strong correlation with respect to $SRa_1$ of the base paper surface.

The SRa value is preferably 0.60 µm or less under the condition of the cut-off of 0.05 to 0.5 mm, and 0.60 µm or less under the condition of the cut-off of 1 to 3 mm. The lower limits of the respective SRa values are preferably closer to 0 µm.

The center surface average roughnesses SRa under the condition of the cut-off of 0.05 to 0.5 mm is carried out with a three-dimensional surface structure analysis microscope (trade name: ZYGO New View 5000, manufactured by ZYGO Co., Ltd.) based on measurement and analysis conditions below.

<Measurement and Analysis Conditions>
  Measurement length: X direction: 10 mm, and Y direction: 10 mm
  Object lens: 2.5-time magnification
  Band pass filter: 0.05 mm to 0.5 mm The center surface average roughnesses SRa under the condition of the cut-off of 1 to 3 mm is carried out with a three-dimensional surface structure analysis microscope (trade name: Nanometro 110F, manufactured by Kuroda Precision Industries Co., Ltd.) based on measurement and analysis conditions below.

<Measurement/Analysis Condition>
  Scanning direction: MD direction of sample
  Measurement length: X direction: 50 mm, and Y direction: 30 mm
  Measurement pitch: X direction: 0.01 mm, and Y direction: 1.0 mm
  Scanning rate: 2 mm/sec
  Band pass filter: 1 mm to 3 mm In the support for image recording material according to the present invention, the thickness of the thermoplastic resin layer(s) formed at least on one or both sides of the base paper is 35 to 60 µm. A thickness of less than 35 µm leads to deterioration in image clarity, prohibiting formation of a photographic feel favorable in glossiness, while a thickness of more than 60 µm leads to an unbalanced texture having a high basis weight but also a lower stiffness. It also results in deterioration in the productivity and increase in the cost of the support. The thickness is particularly preferably 40 to 55 µm.

Melt extrusion, wet lamination, or dry lamination may be used, when a thermoplastic resin layer is formed on both two surfaces (both faces) of the base paper, i.e., when a resin-coated support such as the support for photographic printing paper is prepared by resin lamination. Among the above method, melt-extrusion is most preferable. If a thermoplastic resin layer is formed by melt extrusion, the base paper is preferably pre-treated before melt extrusion of a thermoplastic resin layer onto base paper, for improvement in adhesion between the base paper and the thermoplastic resin layer. For example, widely used is an extrusion lamination method (also called extrusion-coating method) of laminating a resin film on a base paper, by which a resin film is formed on a moving base paper by extruding a thermoplastic resin such as polyolefin from a extrusion die in such a manner that the base paper and the thermoplastic resin are adhered to each other in the nip area between a nip roller and a cooling roller.

Examples of the pretreatment include acid-etching treatment with a mixed sulfuric and chromic acid solution, flame treatment with gas flame, UV irradiation treatment, corona discharge treatment, glow discharge treatment, anchor coat treatment with an alkyl titanate, and the like; and any one of them may be arbitrarily selected. In particular, corona treatment is preferable from the point of convenience. The corona treatment when used should be performed until the resin layer has a contact angle with water of 70° or less.

Examples of the anchor-coating agents known include organic titanium compounds, isocyanates (urethanes), polyethyleneimines, polybutadienes, and the like. Specific examples of the organic titanium compounds include alkyl titanates such as tetraisopropyl titanate, tetrabutyl titanate, and tetrastearyl titanate; titanium acylates such as butoxytitanium stearate; titanium chelates such as titanium acetylacetonate; and the like. Specific examples of known isocyanates (urethanes) include toluene diisocyanate (TDI), diphenylmethane diisocyanate (MDI), hexamethylene diisocyanate (HMDI), xylylene diisocyanate (XDI), isophorone diisocyanate (IPDI), and the like.

In particular in the present invention, it is possible to form a favorably thermoplastic resin layer in the extrusion lamination method, by melt-extruding a polyolefin resin on the base paper and feeding the coated base paper between an elastic roll and a cooling roll at a nip pressure of 2 MPa or more.

There are often minute micropores (hereinafter, referred to as "craters") formed on the surface of the resin film laminated on base paper, and a greater number of these craters damages appearance and glossiness of the film and reduces its commercial value drastically. These craters are said to be the dents in the resin film that are generated when the cooling roller revolves by the air entrained between the resin film and the cooling roller. The craters are formed in a greater amount, when the nip pressure between elastic roll and cooling roll is smaller, the line speed during laminations is greater, the thickness of resin film is smaller, the temperature of the resin extruded from extrusion die is lower, and the surface roughness of base paper is greater. Accordingly, it is possible to suppress generation of the craters and to ensure a planarity favorable in smoothness and glossiness, by controlling the nip pressure between the elastic and cooling rolls to 2 MPa or more. The nip pressure is preferably 3 MPa or more, and the upper limit is preferably 8 MPa.

Examples of the thermoplastic resins constituting the thermoplastic resin layer formed on both faces of the base paper include styrene-butadiene latexes, acrylic latexes, acrylsilicone latexes, polyolefin resins, and the like; and among them, polyolefin resins are preferable. Favorable examples thereof include α-olefin homopolymers such as polyethylene and polypropylene, mixtures of various these polymers, and random copolymers of ethylene and vinylalcohol. LDPE (low-density polyethylene), HDPE (high-density polyethylene), and L-LDPE (linear low-density polyethylene) may be used alone or in combination, as the polyethylene. The polyethylene, when used, preferably has a melt flow rate before processing of 1.2 to 12 g/10 minute, as determined according to JIS 7201.

When a polyolefin layer of a polyolefin (e.g., polyethylene), e.g., a polyethylene layer, is formed, the polyethylene layer to be formed on the face of support, where an image recording layer consisted of image recording material is formed when an image recording material is prepared, preferably contains rutile or anatase-type titanium oxide, a fluorescent brightener, and ultramarine blue for improvement in opaqueness, brightness and hue, as it is widely practiced in preparation of photographic printing papers. The content of titanium oxide is preferably, approximately 3 to 20 wt %, more preferably, 4 to 13 wt %, with respect to the polyethylene.

An undercoat layer may be formed additionally on the polyolefin layer, for the purpose of providing adhesiveness to the image recording layer responsible for image recording (e.g., ink receiving layer in the case of the support for image recording material for use in inkjet recording medium; the image recording layer will be described below). The material for the undercoat layer is preferably a hydrophilic polyester, gelatin, or polyvinylalcohol (PVA); and the thickness of the undercoat layer is preferably 0.01 to 5 μm.

The support for image recording material according to the present invention can be used as a glossy paper, i.e., a resin-coated paper having a thermoplastic resin such as a polyolefin (e.g., polyethylene) formed on the front and rear faces of a base paper (e.g., polyethylene-coated paper), and also as a support having a matte or tweed surface similar to that of ordinary photographic printing papers after it is subjected to a so-called "patterning" treatment during coating of a thermoplastic resin, for example, a polyolefin such as polyethylene, onto the base paper by melt extrusion.

The support for image recording material according to the present invention may also have a backcoat layer on one face of the base paper (in particular, on the face opposite to the image recording layer when an image recording material is prepared). The backcoat layer may contain a white pigment, an aqueous binder, or other components.

Examples of the white pigments favorably added to the backcoat layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, magnesium hydroxide; organic pigments such as styrene-based plastic pigments, acrylic plastic pigments, polyethylene, microcapsules, urea resins, melamine resins; and the like.

Examples of the aqueous binders favorably added to the backcoat layer include water-soluble polymers such as styrene/maleic acid salt copolymers, styrene/acrylic acid salt copolymers, polyvinyl alcohol, silanol-modified polyvinylalcohols, starch, cationized starches, casein, gelatin, carboxymethylcellulose, hydroxyethylcellulose, and polyvinylpyrrolidone; water-dispersible polymers such as styrene butadiene latexes and acrylic emulsions; and the like.

Examples of the other components favorably added to the backcoat layer include antifoaming agents, foaming inhibitors, dyes, fluorescent brighteners, antiseptic substances, water-resistance improvers, and the like.

Favorable embodiments and applications of the support for image recording material according to the present invention are not particularly limited, and the support can be used favorably in various applications that demand the planarity of surface, in particular, applications that demand recording of high-quality image having a favorable glossiness and smoothness and a photograph-like texture, and specifically, it is favorable as a supporting material for the ink-jet recording media, electrophotographic image recording materials, thermal-development recording materials, sublimation-transfer image recording materials, thermal-transfer image recording materials, silver photographic photosensitive materials, and printing papers described below more specifically, and the like.

Hereinafter, the image recording material according to the present invention will be described, taking mainly an inkjet recording medium as an example.

—Image Recording Material—

The image recording material according to the present invention uses the support for image recording material according to the present invention, and has an image recording layer at least on one face of the support for image recording material and other layers as needed. In particular when the image recording medium is used as an inkjet recording medium, an ink receiving layer is formed as the image recording layer.

[Ink-Receiving Layer]

The ink receiving layer, when used as the inkjet recording medium above, contains a water soluble resin and fine particles, and preferably contains at least a water soluble resin, fine particles, a crosslinking agent that can crosslink the water soluble resin, and a mordant, as well as other components such as surfactant as needed.

The ink receiving layer has a porous structure because of the presence of fine particles, and thus, an improved ink-absorbing capacity. In particular, a solid fine-particle content in the ink receiving layer at 50 wt % or more, more preferably 60 wt %, leads to a more favorable porous structure and raises the ink absorbability further. The solid fine-particle content in the ink receiving layer is a content calculated with respect to the components other than water in the composition forming ink receiving layer.

The ink receiving layer having the porous structure above is a layer having a void rate of 50 to 75% and preferably 60 to 70%. A void rate of 50% or less may lead to deterioration in ink absorbability, while a void rate of 75% or more, and may have a problem in pulverization due to shortage of binder. The thickness of the ink receiving layer is preferably 20 to 40 µm, and the 60° glossiness is preferably 30 to 70%, from the point of the quality of the inkjet recording medium.

—Fine Particles—

Both organic and inorganic fine particle may be used as the fine particles. Favorable examples of the organic fine particles include polymer fine particles obtained by emulsion polymerization, microemulsion polymerization, soap-free polymerization, seeding polymerization, dispersion polymerization, suspension polymerization, or the like; and specific examples thereof include powders, latexes or emulsion of polyethylene, polypropylene, polystyrene, polyacrylate, polyamide, silicone resin, phenol resin, natural polymer, and the like.

Examples of the inorganic fine particles include silica fine particles, colloidal silica, titanium dioxide, barium sulfate, calcium silicate, zeolite, kaolinite, halloysite, mica, talc, calcium carbonate, magnesium carbonate, calcium sulfate, pseudo-boehmite, zinc oxide, zinc hydroxide, alumina, aluminum silicate, calcium silicate, magnesium silicate, zirconium oxide, zirconium hydroxide, cerium oxide, lanthanum oxide, yttrium oxide and the like.

Among them, inorganic fine particles are preferable from the points of ink absorbability and image stability, and silica fine particles, colloidal silica, alumina fine particles, or pseudo-boehmite are preferable for forming a favorable porous structure. The fine particles may be used in the primary-particle state or in the secondary-particle state after pulverization. The average primary-particle diameter of the fine particles is preferably 2 µm or less and more preferably 200 nm or less.

Among these, silica fine particles are commonly grouped grossly into wet-method particles and dry-method (gas-phase) particles depending on the manufacturing process. Mainly in the wet process, hydrated silica is produced by preparing activated silica by acid decomposition of a silicate salt, polymerizing the activated silica to a suitable degree, and coagulating or precipitating the polymerized silica. On the other hand in the gas-phase process, anhydrous silica is mainly produced by gas-phase hydrolysis of a halogenated silicon at high temperature (flame hydrolysis method) or by heating and reducing quartz sand with coke in an electric furnace under application of arc and then oxidizing the resulting product with air (arc method); and the "vapor-phase silica" means an anhydrous fine-particular silica produced in the gas-phase process. The vapor-phase silica fine particles are particularly preferably as the silica fine particles in the present invention.

Vapor-phase silica shows properties different from hydrated silica, as it is different in the density of silanol groups and the voids on its surface, and is more suited for forming a three-dimensional structure higher in void percentage. Although the reason is not clearly understood, it seems that hydrated silica having silanol groups on the fine particle surface at a higher density of 5 to 8 groups per $nm^2$ tend to aggregate more densely, while vapor-phase silica having silanol groups on the fine particle surface at a smaller density of 2 to 3 groups per $nm^2$ tend to flocculate thinly, consequently leading to a structure higher in void percentage.

The vapor-phase silica has a particularly larger specific surface area, leading to an increased efficiency of ink absorption and retention and a low refractive index, and thus, provides the receiving layer with transparency and consequently, high color density and favorable coloring, if dispersed well to a suitable particle diameter. Transparency of the receiving layer is important not only for applications demanding transparency such as OHP sheets but also for the applications of the recording sheets such as photographic glossy paper, and especially for obtaining high color density and favorable color glossiness.

The average primary particle diameter of the vapor-phase silica is preferably 50 nm or less, more preferably 20 nm or less, still more preferably 10 nm or less, and most preferably 3 to 10 nm. The vapor-phase silica particles tend to adhere to each other by hydrogen bonding of the silanol groups, form a structure lager in void percentage, and improve the ink-absorbing capacity effectively, when the average primary particle diameter is 50 nm or less.

The silica fine particles may be used together with the other fine particles described above. When the other fine particles and vapor-phase silica are used in combination, the content of the silica fine particles (especially, vapor-phase silica) in the entire fine particles is preferably 30 wt % or more and more preferably 50 wt % or more.

Alumina fine particles, alumina hydrate, and the mixture or the composite thereof are also favorable as the inorganic fine particles. Among them, alumina hydrate is preferably, as it absorbs and retains ink well, and particularly, pseudo-boehmite ($Al_2O_3$-$nH_2O$) is preferable. Alumina hydrate is usable in a variety of forms, however boehmite in the sol form is preferable, as it allows easier production of a smooth film.

Regarding the micropore structure of pseudo-boehmite, the average pore radius is preferably 1 to 25 nm and more preferably 2 to 10 nm. In addition, the pore volume is preferably 0.3 to 2.0 ml/g and more preferably 0.5 to 1.5 ml/g. The micropore radius and the pore volume are those determined by nitrogen absorption/desorption method, for example, by using a gas absorption/desorption analyzer (e.g., trade name: "Omnisoap 369", manufactured by Coulter).

Among various alumina fine particles, gas-phase alumina fine particles having a larger specific surface area are preferable. The average primary particle diameter of the gas-phase alumina fine particles is preferably 50 nm or less and more preferably 20 nm or less. In addition, colloidal silica having an average primary particle diameter of 50 nm or less is also used favorably.

The fine particles above may be used favorably in the forms described, for example, in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314, and others.

—Water-Soluble Resin—

The ink receiving layer preferably contains at least one water soluble resin, and examples of the water soluble resins include polyvinyl alcohol resins having a hydroxy group as the hydrophilic structural unit (polyvinyl alcohol (PVA), acetoacetyl-modified polyvinyl alcohols, cation-modified polyvinyl alcohols, anion-modified polyvinyl alcohols, silanol-modified polyvinyl alcohols, polyvinylacetal, etc.), cellulosic resins (methylcellulose (MC), ethylcellulose (EC), hydroxyethylcellulose (HEC), carboxymethylcellulose (CMC), hydroxypropylcellulose (HPC), hydroxyethylmethylcellulose, hydroxypropylmethylcellulose, etc.), chitins, chitosans, starch, resins having an ether bond (polyethylene oxide (PEO), polypropylene oxide (PPO), polyethylene glycol (PEG), polyvinylether (PVE), etc.), resins having a carbamoyl group (polyacrylamide (PAAM), polyvinylpyrrolidone (PVP), polyacrylic acid hydrazide, etc.), and the like. Among them, polyvinylalcohol resins, cellulosic resins, ether bond-containing resins, carbamoyl group-containing resins, carboxyl group-containing resins, and gelatins are preferable.

Also included are polyacrylic acid salts, maleic acid resins, alginic acid salt resins, and gelatins having a carboxyl group as the dissociative group.

Among the resins above, polyvinylalcohol resins are particularly preferable. Examples of the polyvinylalcohols include those described in Japanese Patent Application Publication (JP-B) Nos. 4-52786, 5-67432, and 7-29479; Japanese Patent No. 2537827; JP-B No. 7-57553; Japanese Patent Nos. 2502998 and 3053231; JP-A No. 63-176173; Japanese Patent No. 2604367; JP-A Nos. 7-276787, 9-207425, 11-58941, 2000-135858, 2001-205924, and 2001-287444; JP-A Nos. 62-278080 and 9-39373; Japanese Patent No. 2750433; JP-A Nos. 2000-158801, 2001-213045, and 2001-328345; JP-A Nos. 8-324105 and 11-348417; and others.

These water soluble resins may be used alone or in combination of two or more. The amount of the water soluble resin is preferably 9 to 40 wt % and more preferably 12 to 33 wt % with respect to the total solid contents in the ink receiving layer.

The fine particles and the water soluble resin, two primary constituents of the ink receiving layer of inkjet recording medium, may be respectively a single material or a mixture of multiple materials.

From the viewpoint of ensuring transparency, the kind of the water soluble resin used together with the fine particles, in particular with silica fine particles, is important. If a vapor-phase silica is used, the water soluble resin is preferably a polyvinyl alcohol resins, more preferably a polyvinyl alcohol resins having a saponification value of 70 to 100%, still more preferably a polyvinyl alcohol resin having a saponification value of 80 to 99.5%.

The polyvinyl alcohol resin above has a hydroxyl group in the structural unit, and thus allows easier formation of a three-dimensional network structure having secondary particles of the silica fine particles as the network chain unit due to hydrogen bonding between the hydroxyl group and the surface silanol groups on the silica fine particles. Formation of the three-dimensional network structure seems to be the reason for formation of an ink receiving layer having a porous structure higher in void percentage and sufficient in strength.

The porous ink receiving layer obtained as described above absorbs ink rapidly by capillary phenomenon and provides completely circular ink dots without bleeding during ink-jet recording.

In addition, the polyvinylalcohol resin may contain one of the other water soluble resins additionally. When the other water soluble resin and the polyvinylalcohol resin are used in combination, the content of polyvinylalcohol resin in the entire water soluble resin is preferably 50 wt % or more and more preferably 70 wt % or more.

<Ratio of the Contents of Fine Particles and Water Soluble Resin>

The weight ratio [PB ratio (x:y)] of fine particles (x) to water soluble resin (y) exerts a significant influence on the structure and the film strength of ink receiving layer. If the PB ratio is larger, the void percentage, pore volume, and surface area (per unit weight) increase, however the density and strength tend to be decreased.

The PB ratio (x/y) of the ink receiving layer is preferably 1.5 to 10, for the purpose of preventing the decrease in film strength and the cracks thereon during drying caused by the excessively greater PB ratio and for the purpose of preventing the decrease in void percentage due to the voids being filled with the resin caused by the excessively smaller PB ratio and the resulting decrease in ink absorptive capacity.

The ink receiving layer should have a sufficiently high film strength, because the ink-jet recording medium is exposed to stress during it is conveyed in an inkjet printer, and the ink receiving layer should have a sufficiently high film strength also for prevention of cracking and exfoliation of the ink receiving layer when the ink-jet recording medium is cut into the sheet form. Considering the above, the PB ratio (x:y) is more preferably 5 or less and 2 or more for ensuring superior ink absorptive properties during high-speed printing in inkjet printer.

For example, when an aqueous coating dispersion containing a vapor-phase silica having an average primary-particle diameter of 20 nm or less and a water soluble resin at a PB ratio (x:y) of 2 to 5 is applied and dried on a support, a three-dimensional network structure having the secondary particles of silica fine particles as the network chain is formed, allowing easier preparation of a transparent porous film having an average micropore diameter of 25 nm or less, a void percentage of 50 to 80%, a micropore specific volume of 0.5 ml/g or more, and a specific surface area of 100 m²/g or more.

—Crosslinking Agent—

In the ink receiving layer according to the present invention, the layer containing fine particles and a water soluble resin described above preferably contains additionally a cross-linking agent that crosslinks the water soluble resin, and accordingly, it is preferably a porous layer hardened by the crosslinking reaction between the cross-linking agent and the water soluble resin.

A boron compound is preferably used for crosslinking the water soluble resin above, particularly for crosslinking polyvinyl alcohol. Examples of the boron compounds include borax, boric acid, borate salts [e.g., orthoborate salts such as $InBO_3$, $ScBO_3$, $YBO_3$, $LaBO_3$, $Mg_3(BO_3)_2$, and $CO_3(BO_3)_2$), diborate salts (e.g., $Mg_2B_2O_5$, and $CO_2B_2O_5$), metaborate salts (e.g., $LiBO_2$, $Ca(BO_2)_2$, $NaBO_2$, and $KBO_2$), tetraborate salts (e.g. $Na_2B_4O_7.10H_2O$), pentaborate salts (e.g., $KB_5O_8.4H_2O$, $Ca_2B_6O_{11}.7H_2O$, and $CsB_5O_5$). Among them, borax, boric acid, and borate salts are preferable; and boric acid is particularly preferable from the viewpoint of the speed of crosslinking reaction.

In addition to the crosslinking agents above, the following cross-linking agents other than the boron compounds above may also be used for crosslinking the water soluble resins.

Examples thereof include aldehyde compounds such as formaldehyde, glyoxal, and glutaric aldehyde; ketone compounds such as diacetyl and cyclopentandione; activated halogen compounds such as bis(2-chloroethylurea)-2-hydroxy-4,6-dichloro-1,3,5-triazine, and 2,4-dichloro-6-S-triazine sodium salt; activated vinyl compounds such as divinylsulfonic acid, 1,3-vinylsulfonyl-2-propanol, N,N'-ethylene-bis(vinylsulfonylacetamide), and 1,3,5-triacryloyl-hexahydro-5-triazine; N-methylol compounds such as dimethylolurea and methyloldimethylhydantoin; melamine resins (e.g., methylolmelamine and alkylated methylolmelamines); epoxy resins;

isocyanate compounds such as 1,6-hexamethylene diisocyanate; aziridine compounds described in U.S. Pat. Nos. 3,017,280 and 2,983,611; carboxylmide compounds described in U.S. Pat. No. 3,100,704; epoxy compounds such as glycerol triglycidylether; ethyleneimino compounds such as 1,6-hexamethylene-N,N'-bisethyleneurea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chrome alum, potash alum, zirconyl acetate, and chromium acetate; polyamine compounds such as tetraethylenepentamine; hydrazide compounds such as adipic acid dihydrazide; small molecules or polymers containing two or more oxazoline groups; and the like.

The cross-linking agents may be used alone or in combination of two or more.

The crosslinking and hardening is preferably carried out by adding a crosslinking agent to a coating solution containing fine particles, a water soluble resin, and others for forming an ink receiving layer (hereinafter, also referred to as "coating solution for ink receiving layer" or "first solution") and/or the basic solution described below, forming a coated film by applying the coating solution, and adding the basic solution at a pH of 7.1 or higher (hereinafter, referred to as "second solution") to the coated film either (1) simultaneously simultaneously with the coating of the coating solution to form the coated layer, or (2) during drying of the coated layer before the coated layer exhibits a reduced rate of drying.

For example, in the case of a boron compound, the crosslinking agent is added in the following manner:

When the ink receiving layer is a layer formed by crosslinking a coated film obtained by applying a coating solution containing microparticles and a water soluble resin including polyvinyl alcohol (first solution A), the crosslinking and hardening is carried out by forming the coated film by applying the coating solution, and adding a basic solution at a pH of 7.1 or more (second solution) to the coated film either (1) simultaneously when the coated film is formed or (2) before the coated film shows a falling drying rate during the course of drying. The boron compound used as the crosslinking agent may be contained in any one or both of the first and second coating solutions.

The amount of the cross-linking agent used is preferably 1 to 50 wt %, more preferably 5 to 40 wt %, with respect to the weight of the water soluble resin.

—Mordant—

In the present invention, it is preferable to add a mordant into the ink receiving layer, for improvement in the water resistance of formed images and in the efficiency of preventing ink bleeding over time. Both organic mordants such as cationic polymers (cationic mordants) and inorganic mordants such as water-soluble metal compounds may be used as the mordant. Among them, organic mordants are preferably, and cationic mordants are particularly preferable.

Presence of the mordant at least in the upper layer of the ink receiving layer leads to interaction of the layer with liquid ink containing an anionic dye as the colorant, stabilizing the colorant and improving the water resistance and the ink-breeding resistance thereof over time.

In such a case, the mordant may be contained in the coating solution for ink receiving layer (first solution) or the basic solution (second solution) for use in preparation of the ink receiving layer, but is preferably contained in the second solution, which is different from the solution containing inorganic fine particles (in particular, vapor-phase silica). Thus, direct addition of the mordant into the coating solution for ink receiving layer may results in aggregation in the presence of the vapor-phase silica carrying anionic charges, however it is not necessary to concern about the aggregation of inorganic fine particles and there is greater freedom in selecting the mordant, by using a method of preparing a mordant-containing solution and a coating solution for ink receiving layer separately and coating the solutions separately.

Polymeric mordants having a primary to tertiary amino group or a quaternary ammonium salt group as the cationic functional group are favorably used as the cationic mordant, however non-polymeric cationic mordants may also be used.

Homopolymers from a monomer having a primary to tertiary amino group or a salt thereof or a quaternary ammonium salt group (hereinafter, referred to as the "mordant monomer") and copolymers or condensation polymers of the mordant monomer with another monomer (hereinafter, referred to as "non-mordant monomer") are more preferably as the polymeric mordant. These polymeric mordant may be used in the form of a water-soluble polymer or a latex dispersed in water.

Examples of the mordant monomers include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

quaternary ammonium salts prepared in the reaction of methyl chloride, ethyl chloride, methyl bromide, ethyl bromide, methyl iodide or ethyl iodide with N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, or N,N-diethylaminopropyl(meth)acrylamide; the anion-exchanged salts thereof such as sulfonate salt, alkylsulfate salt, acetate salt or alkylcarboxylate salt; and the like.

Specific examples of the compounds above include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride;

N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, trimethyl-3-(acryloylamino)propylammonium acetate, and the like.

In addition, N-vinylimidazole, N-vinyl-2-methylimidazole, or the like may be used as the copolymerizable monomer.

Additionally, allylamine, diallylamine, and the derivatives and salts thereof may also be used. Examples of such compounds include allylamine, allylamine hydrochloride salt, allylamine acetate salt, allylamine sulfate salt, diallylamine, diallylamine hydrochloride, diallylamine acetate salt, diallylamine sulfate salt, diallylmethylamine and the salts thereof (including, for example, hydrochloride salt, acetate salt, sulfate salt, etc.), diallylethylamine and the salts thereof (including, for example, hydrochloride salt, acetate salt, sulfate salt, etc.), diallyldimethylammonium salts (the counter anions thereof including chloride, acetate ion, sulfate ion, etc.), and the like. These allylamines and diallylamine derivatives are less polymerizable in the amine form and thus generally polymerized in the salt form; and the counter ion is removed after polymerization as needed. Also usable are polymers obtained by polymerizing a compound containing a unit such as N-vinylacetamide, N-vinylformamide, or the like and converting the resulting polymer into polyamine by hydrolysis and then into the salt.

The non-mordant monomer described above is a monomer having no basic or cationic group such as a primary to tertiary amino group or the salt thereof, or a quaternary ammonium salt group that has no or practically smaller interaction with the dye in ink-jet ink.

Examples of the non-mordant monomers include alkyl (meth)acrylate esters; cycloalkyl(meth)acrylate esters such as cyclohexyl(meth)acrylate; aryl(meth)acrylate esters such as phenyl(meth)acrylate; aralkyl esters such as benzyl(meth)acrylate; aromatic vinyl compounds such as styrene, vinyltoluene, and α-thylstyrene; vinyl esters such as vinyl acetate, vinyl propionate, and vinyl versatate; allyl esters such as allyl acetate; halogen-containing monomers such as vinylidene chloride and vinyl chloride; vinyl cyanides such as (meth)acrylonitrile; olefins such as ethylene and propylene; and the like.

The alkyl(meth)acrylate ester described above preferably has an alkyl group having 1 to 18 carbon atoms, and specific examples thereof include methyl(meth)acrylate, ethyl (meth)acrylate, propyl(meth)acrylate, isopropyl(meth)acrylate, n-butyl(meth)acrylate, isobutyl(meth)acrylate, t-butyl(meth)acrylate, hexyl(meth)acrylate, octyl(meth)acrylate, 2-ethylhexyl(meth)acrylate, lauryl(meth)acrylate, stearyl(meth)acrylate, and the like. Among them, methyl acrylate, ethyl acrylate, methyl methacrylate, ethyl methacrylate, and hydroxyethyl methacrylate are preferable. The non-mordant monomers may also be used alone or in combination of tow or more.

Favorable examples of the polymer mordants include polydiallyldimethylammonium chloride, polymethacryloyloxyethyl-β-hydroxyethyldimethylammonium chloride, polyethyleneimine, polyallylamine and the derivatives thereof, polyamide-polyamine resins, cationic starch, dicyandiamide formalin condensates, dimethyl-2-hydroxypropylammonium salt polymers, polyamidine, polyvinylamine, dicyandiamide-formalin polycondensates such as dicyan-based cationic resins, dicyanamide-diethylenetriamine polycondensates typified by polyamine-based cationic resins, epichlorohydrin-dimethylamine addition polymers, dimethyldiallylammonium chloride-$SO_2$ copolymers, diallylamine salt-$SO_2$ copolymers, (meth)acrylate-containing polymers having a quaternary ammonium salt group-substituted alkyl group in the ester region, styryl polymers having a quaternary ammonium salt group-substituted alkyl group, and the like.

Specific examples of the cationic mordants include those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236; U.S. Pat. Nos. 2,484,430, 2,548,564, 3,148,061, 3,309,690, 4,115,124, 4,124,386, 4,193,800, 4,273,853, 4,282,305, and 4,450,224; JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314; JP-B Nos. 5-35162, 5-35163, 5-35164, and 5-88846; JP-A Nos. 7-118333 and 2000-344990; Japanese Patent Nos. 2648847 and 2661677; and others. Among them, polyallylamines and the derivatives thereof are particularly preferable, and diallyldialkyl cationic polymers are structurally preferable.

Any one of various known allylamine polymers and the derivatives thereof may be used as the polyallylamine or the derivative thereof according to the present invention. Examples of the derivatives include salts of polyallylamine with an acid (acids including inorganic acids such as hydrochloric acid, sulfuric acid, phosphoric acid, and nitric acid; and organic acids such as methanesulfonic acid, toluenesulfonic acid, acetic acid, propionic acid, cinnamic acid, and (meth)acrylic acid), or the mixed salts thereof or partial salts of allylamine); and derivatives of polyallylamines formed in polymerization reaction; copolymers from a polyallylamine and another copolymerizable monomer (specific examples of the copolymerizable monomers including (meth)acrylic esters, styrenes, (meth)acrylamides, acrylonitrile, vinyl esters, etc.).

Specific examples of the polyallylamines and the derivatives thereof include those described in JP-B Nos. 62-31722, 2-14364, 63-43402, 63-43403, 63-45721, 63-29881, 1-26362, 2-56365, 2-57084, 4-41686, 6-2780, 6-45649, 6-15592, and 4-68622; Japanese Patent Nos. 3199227 and 3008369; JP-A Nos. 10-330427, 11-21321, 2000-281728, 2001-106736, 62-256801, 7-173286, 7-213897, 9-235318, 9-302026, and 11-21321; WO Nos. 99/21901 and 99/19372; JP-A No. 5-140213; Japanese Patent Application National Publication (Laid-Open) No. 11-506488; and others.

Among the cationic mordants above, diallydialkyl cationic polymers are preferable, and diallydimethyl cationic polymers are particularly preferable. The cationic mordant is preferably a cationic polymer having a weight-average molecular weight of 60,000 or less, more preferably of 40,000 or less, from the viewpoints of dispersibility, especially of preventing increase in viscosity.

The cationic mordant is also useful as the dispersant for the fine particles above.

When added into the coating solution for ink receiving layers, the concentration of sulfate ions in the coating solution is preferably 1.5% or less by weight, for preventing a increase in viscosity. The sulfate ion derives from the polymerization initiator or the like used during production of the cationic polymer, and accordingly, it is advantageous to use a cationic mordant prepared by using a polymerization initiator or the like that does not release sulfate ions, because the sulfate ions remain in the polymer during production of the cationic polymer.

The inorganic mordants include polyvalent water-soluble metal salts and hydrophobic metal salt compounds, specifically, the salts or complexes of a metal such as magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, or bismuth.

Specific examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, cupric ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octanoate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, undecatungstophosphoric acid n-hydrate, undecatungstosilicic acid 26-hydrate, molybdenum chloride, undecamolybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium 2-octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, and the like.

Among the inorganic mordants, aluminum-containing compounds, titanium-containing compounds, zirconium-containing compounds, and metal compounds (salts or complexes) of the metal in group IIIB of the periodic table are preferable. The amount of the mordant added in the ink receiving layer is preferably 0.01 to 5 g/m$^2$ and more preferably 0.1 to 3 g/m$^2$.

—Other Components—

The ink receiving layer according to the present invention may additionally contain, as needed, various additives known in the art such as acid, ultraviolet-absorbent, antioxidant, fluorescent whitening agent, monomer, polymerization initiator, polymerization inhibitor, anti-bleeding agent, antiseptic agent, viscosity stabilization agent, antifoamer, surfactant, antistatic agent, matting agent, anti-curl agent, water-resistance imparting agent.

The other components may be used alone or in combination of two or more. The other components may be added after solubilized or dispersed in water, dispersed in polymer, emulsified, converted into oil droplets, or contained in microcapsules. The amount of the other components added is preferably 0.01 to 10 g/m$^2$.

The inorganic surface of the inorganic fine particles may be finished with a silane-coupling agent for improvement in dispersion. A compound having a coupling unit as well as an organic functional group (e.g., vinyl, amino, epoxy, mercapto, chloro, alkyl, phenyl, ester group, etc.) is preferable as the silane-coupling agent.

In the present invention, the coating solution for the ink receiving layer preferably contains a surfactant. Any one of cationic, anionic, nonionic, ampholytic, fluorine-based, and silicone surfactants may be used as the surfactant.

Examples of the nonionic surfactants include polyoxyalkylene alkyl ethers and polyoxyalkylene alkylphenyl ethers (e.g., diethylene glycol monoethylether, diethylene glycol diethylether, polyoxyethylene laurylether, polyoxyethylene stearylether, polyoxyethylene nonylphenylether, etc.), oxyethylene-oxypropylene block copolymers; sorbitan fatty acid esters (e.g., sorbitan monolaurate, sorbitan monooleate, sorbitan trioleate, etc.), polyoxyethylene sorbitan fatty acid esters (e.g., polyoxyethylene sorbitan monolaurate, polyoxyethylene sorbitan monooleate, polyoxyethylene sorbitan trioleate, etc.), polyoxyethylene sorbitol fatty acid esters (e.g., polyoxyethylene tetraoleate sorbit, etc.), glycerol fatty acid esters (e.g., glycerol monooleate, etc.), polyoxyethylene glycerol fatty acid esters; (polyoxyethylene glycerol monostearate, polyoxyethylene glycerol monooleate, etc.), polyoxyethylene fatty acid esters (polyethylene glycol monolaurate, polyethylene glycol monooleate, etc.), polyoxyethylene alkylamine, acetylene glycols (e.g., 2,4,7,9-tetramethyl-5-decyne-4,7-diol, and the ethylene- and propylene-oxide adducts of the diol, etc.), and the like; and polyoxyalkylene alkylethers are preferable. The nonionic surfactant may be contained in the coating solution for ink receiving layer.

The amphoteric surfactants include amino acid-type, carboxy ammonium betaine-type, sulfone ammonium betaine-type, ammonium sulfate ester betaine-type, imidazolium betaine-type, and other surfactants, and favorable examples thereof include those described in U.S. Pat. No. 3,843,368; JP-A Nos. 59-49535, 63-236546, 5-303205, 8-262742, and 10-282619; and others. The amphoteric surfactant is preferably an amino acid-type amphoteric surfactant; and examples of the amino acid-type amphoteric surfactants include N-aminoacylated derivatives of an amino acid (such as glycine, glutamic acid, or histidinic acid) having a long-chain acyl group and the salts thereof, such as those described in JP-A No. 5-303205.

Examples of the anionic surfactants include fatty acid salts (e.g., sodium stearate and potassium oleate), alkylsulfuric acid ester salts (e.g., sodium laurylsulfate and laurylsulfuric acid triethanolamine), sulfonate salts (e.g., sodium dodecylbenzenesulfonate), alkyl sulfosuccinate salts (e.g., sodium dioctylsulfosuccinate), alkyldiphenylether disulfonic acid salts, alkylphosphoric acid salts, and the like. Examples of the cationic surfactants above include alkylamine salts, quaternary ammonium salts, pyridinium salts, imidazolium salts, and the like.

The fluorochemical surfactants above include compounds prepared via an intermediate having a perfluoroalkyl group by means of electrolytic fluorination, telomerization, oligomerization or the like. Example of these compounds include perfluoroalkyl sulfonate salts, perfluoroalkyl carboxylate salts, perfluoroalkyl ethylene-oxide adducts, perfluoroalkyl-trialkylammonium salts, perfluoroalkyl group-containing oligomers, perfluoroalkyl phosphate esters, and the like.

Silicone oils modified with organic groups are favorable as the silicone surfactant above, and the silicone surfactants may have a siloxane structural unit having the side-chain modified with an organic group or having one or both ends of the surfactant modified therewith. The organic-group modification includes amino modification, polyether modification, epoxy modification, carboxyl modification, carbinol modification, alkyl modification, aralkyl modification, phenol modification, fluorine modification, and the like.

The content of the surfactant is preferably 0.001 to 2.0%, more preferably 0.01 to 1.0%, in the coating solution for ink receiving layer.

The ink receiving layer is favorably prepared, for example, by a method (Wet-on-Wet method) of forming a coated film by applying a coating solution at least containing microparticles and a water soluble resin on a support surface after adding a crosslinking agent to the coating solution and/or the following basic solution; applying a basic solution at a pH of 7.1 or more thereon either (1) when the coating solution is applied or (2) before the coated layer shows a falling drying rate while it is dried; and crosslinking and hardening the coated layer. The crosslinking agent that crosslinks the water soluble resin is preferably contained in at least one or both of the coating and basic solutions. Presence of such a crosslinked and hardened ink receiving layer is advantageous from the viewpoint of the ink absorbability and for prevention of cracking of the film.

The thickness of the mordant-containing layer from the surface of the receiving layer is preferably 10 to 60% of the thickness of the receiving layer. The layer can be formed by an arbitrary method, for example, by a method (1) of forming a coated film containing the fine particles, a water soluble resin, and a crosslinking agent and coating a mordant-containing solution thereon, or a method (2) of coating a coating solution containing fine particles and a water soluble resin and a mordant-containing solution into a multi-layered structure. The mordant-containing solution may contain inorganic fine particles, a water soluble resin, a crosslinking agent, or the like.

Addition thereof as described above is favorable, as it makes the mordant rich in a particular region in the ink receiving layer, allowing the inkjet colorant ejected thereon to develop color sufficiently and improving the color density, ink-bleeding resistance over time, glossiness of printed region, and water and ozone resistance of the printed characters and images. Part of the mordant may be contained in the layer first formed on the support, and, in such a case, the mordant added later may be the same as or different from the former mordant.

In the present invention, the coating solution for ink receiving layer (first solution) containing fine particles (e.g., vapor-phase silica) and a water soluble resin (e.g., polyvinylalcohol) is prepared, for example, as followings:

A coating solution is prepared, by adding fine particles, for example, of vapor-phase silica and a dispersant to water (e.g., silica fine particles in water: 10 to 20 wt %); dispersing the mixture, for example, in a high-revolution wet colloid mill (e.g., "CLEARMIX", manufactured by M Technique Co., Ltd.), for example, under a high-revolution condition at 10,000 rpm (preferably 5,000 to 20,000 rpm) for 20 minutes (preferably 10 to 30 minutes); adding an aqueous polyvinylalcohol (PVA) solution thereto (e.g., PVA in an amount of approximately ⅓ of the vapor-phase silica); and dispersing the mixture under the same agitation condition additionally. It is preferable to adjust the dispersion with ammonia water to a pH of approximately 9.2 or to use a dispersant, to make the coating solution more stable. The coating solution obtained is in a homogeneous sol state, and it is possible to form a porous ink receiving layer having a three-dimensional network structure by coating the solution on a support by the following application method.

In addition to the high-revolution wet colloid mill above, any one of colloid mill-dispersing machines other than the high-revolution wet colloid mill, such as high-speed rotary dispersing machines, medium-agitating dispersing machines (such as ball mill and sand mill), ultrasonic dispersing machines, high-pressure dispersing machines, and the like, may be used as the dispersing machine for use in dispersion. Among them, use of a medium-agitating dispersing machine, a colloid mill dispersing machine (e.g., high-revolution wet colloid mill), or a high-pressure dispersing machine is preferable, for effective dispersion of the flocculated fine particles formed.

Water, an organic solvent, or a mixed solvent thereof may be used as the solvent in each step. Examples of the organic solvents for use in coating include alcohols such as methanol, ethanol, n-propanol, i-propanol and methoxypropanol, ketones such as acetone and methylethylketone, tetrahydrofuran, acetonitrile, ethyl butyrate, toluene.

Alternatively, a cationic polymer may be used as the dispersant. Examples of the cationic polymers include those for the mordant described above, and the like. In addition, use of a silane-coupling agent, as the dispersant is also preferable.

The amount of the dispersant added is preferably 0.1 to 30 wt % and more preferably 1 to 10 wt %, with respect to the fine particles.

The coating solution for ink receiving layer may be coated by any one of known application methods, for example, by using an extrusion die coater, air doctor coater, blade coater, rod coater, knife coater, squeeze coater, reverse roll coater, bar coater, or the like.

The basic solution (second solution) is applied on the coated film during or after application of the coating solution for ink receiving layer (first solution), however the second solution may be applied so that the coated film after application shows a falling drying rate. That is, the ink receiving layer can be prepared favorably by applying the second solution during the coated film shows a constant drying rate after application of the coating solution for ink receiving layer (first solution). The second solution may contain a mordant.

The period "before the coated film shows a falling drying rate" normally means a period for several minutes after application of the coating solution for ink receiving layer, when the coated film shows a constant-rate drying phenomenon in which the content of the solvent in the coated film (dispersion medium) declines in proportion to time. The period of this "constant-rate drying" is described in, for example, Chemical Engineering Handbook (p. 707 to 712, published by Maruzen Co., Ltd., Oct. 25, 1980).

As described above, the coated layer after application of the first solution is dried normally at 40 to 180° C. for 0.5 to 10 minutes (preferably, 0.5 to 5 minutes) until the coated layer exhibits falling rate drying. The drying period, of course, varies according to the amount coated, but is commonly in the above range.

The second solution may be applied before the coated film of the first solution shows a falling drying rate, for example, by the method of (1) coating the second solution on the coated film, (2) spraying the second solution thereon, (3) immersing the support carrying the coated film in the second solution, or the like.

In the method (i), the second solution may coated by any one of coating methods known in the art such as those using a curtain flow coater, extrusion die coater, air doctor coater, blade coater, rod coater, knife coater, squeeze coater, reverse roll coater, bar coater, or the like. Among them, favorably used is a coating method whereby the coater does not become into direct contact with the first coated layer, such as that using an extrusion die coater, curtain flow coater, bar coater.

The second solution is commonly dried and cured after application by heating at 40 to 180° C. for 0.5 to 30 minutes. Preferably, the solution is heated at 40 to 150° C. for 1 to 20 minutes.

Alternatively, if the basic solution (second solution) is applied simultaneously with the coating solution for ink receiving layer (first solution), it is possible to form an ink receiving layer by applying the first and second solutions simultaneously on a support with the first solution in contact with the support (multi-layer application) and drying and hardening the resulting coated film.

The simultaneous application (multi-layer application) may be performed by the coating method using, for example, an extrusion die coater or curtain flow coater. The coated layer formed after the simultaneous application is then dried, and the coated layer in such a case is normally dried by heating at 40 to 150° C. for 0.5 to 10 minutes, preferably, at 40 to 100° C. for 0.5 to 5 minutes.

When the simultaneous application (multi-layer application) is performed, for example, by using an extrusion die coater, two kinds of liquids simultaneously extruded are laminated in the neighborhood of the outlet of the extrusion die coater, i.e., before the liquids are applied onto the support and then applied onto the support as they are laminated. The two layers of coating solutions laminated before application tend to have a crosslinking reaction at the interface of the two solutions before they are applied onto the support, often causing increase in viscosity due to mixing of the two solutions at the neighborhood of the extrusion die coater and occasionally causing troubles in the application operation. Therefore, during the simultaneous application above, it is preferable to add a barrier-layer solution (intermediate-layer solution) between the first and second solutions (simultaneous three-layer application).

The barrier-layer solution is not particularly limited, and examples thereof include an aqueous solution containing a trace amount of water soluble resins, water, and the like. The water soluble resins are used considering the coating property of the solution, for example, for increasing the viscosity of the solution, and examples thereof are polymers including cellulosic resins (e.g., hydroxypropylmethylcellulose, methylcellulose, hydroxyethylmethylcellulose, etc.), polyvinylpyrrolidone, gelatin, and the like. The barrier-layer solution may also contain a mordant.

After formed on the support, the ink receiving layer may be subjected to calendering through roll nips under heat and pressure, for example, in a super or gloss calendering machine or the like, for improvement in the surface smoothness, glossiness, transparency, and strength of the coated film. However, because the calendering sometimes causes decrease in void percentage (i.e., decrease in ink absorbability), it is necessary to establish a condition suitable for reducing the decrease in void percentage before calendering.

The roll temperature during calendering is preferably 30 to 150° C., more preferably 40 to 100° C., and the linear pressure between rolls during calendering is preferably 50 to 400 kg/cm, more preferably 100 to 200 kg/cm.

In the case of inkjet recording, the thickness of the ink receiving layer should be decided according to the void percentage of the layer, as the layer should have a sufficient absorbability allowing absorption of all droplets. For example, if the ink amount is 8 mL/mm$^2$ and the void percentage is 60%, a film having a thickness of approximately 15 μm or more is preferable.

Considering the above, the ink receiving layer for inkjet recording preferably has a thickness of 10 to 50 μm.

In addition, the diameter of the voids in the ink receiving layer is preferably 0.005 to 0.030 μm, more preferably 0.01 to 0.025 μm, as median diameter.

The void percentage and the void median diameter may be determined by using a mercury porosimeter (trade name: "Poresizer 9320-PC2", manufactured by Shimadzu Corporation).

The ink receiving layer is preferably higher in transparency, and the haze value, an indicator of transparency, of the ink receiving layer formed on a transparent film support is preferably 30% or less and more preferably 20% or less.

The haze value may be determined by using a hazemeter (trade name: HGM-2DP, manufactured by Suga Test Instrument Co., Ltd.).

A polymer fine particles dispersion may be added to a layer constituting the inkjet recording medium obtained by the present invention (e.g., ink receiving layer or back layer). The polymer fine particles dispersion is used for the purpose of improving the physical properties of the film, specifically of improving dimensional stability and preventing curling, adhesion, cracking of the film. Such polymer fine particle dispersions are described in JP-A Nos. 62-245258, 62-1316648, and 62-110066. Addition of the dispersion containing polymer fine particles having a low glass transition temperature (of 40° C. or lower) to the mordant-containing layer is effective in preventing cracking and curling of the layer. Alternatively, addition of a dispersion containing polymer fine particles having a high glass transition temperature is also effective in preventing curling.

Hereinafter, image recording media other than the inkjet recording medium will be described.

—Electrophotographic Image-Receiving Material—

The electrophotographic image-receiving material comprises a support for image recording material according to the present invention and at least one toner-receiving layer (recording layer) formed at least on one face of the support, as well as other layers properly selected as needed, such as surface protective layer, intermediate layer, undercoat layer, cushion layer, electrostatic charge-controlling (antistatic) layer, reflective layer, color tone-adjusting layer, storage life-improving layer, antiadhesive layer, anticurl layer, and smoothing layer. Each of these layers may have a single-layer structure or a laminated structure.

—Silver Photographic Photosensitive Material—

The silver photographic photosensitive material has, for example, a configuration in which a photosensitive layer (recording layer) developing colors at least in YMC is formed on a support for image recording material according to the present invention, and examples thereof include, for example, the materials used in silver-halide-photography systems in which an image is obtained while the material is first exposed to light, color-developed, bleached and fixed, and rinsed with water, as it is immersed successively in multiple processing tanks, and dried.

—Thermal-Transfer Image Recording Material—

The thermal-transfer image recording material has a configuration in which, for example, at least an image-receiving layer (recording layer) is formed on a support for the image recording material according to the present invention, and examples thereof include, for example, the materials used in the system in which ink contained in a thermomelting ink layer is melt-transferred by heating a thermal image-receiving medium having at least one thermomelting ink layer on the support with a thermal head.

—Thermal Developing/Recording Material—

The thermal developing/recording material has a configuration, for example, in which at least a thermal developing layer (recording layer) is formed on a support for image recording material according to the present invention, and examples thereof include, for example, the materials used in the thermoautochrome systems (TA systems) in which an image is formed by thermal color development caused by repeating to heat with thermal head and fix with ultraviolet ray.

—Sublimation-Transfer Image-Receiving Material—

The sublimation-transfer image recording material has a configuration, for example, in which at least an image-receiving layer (recording layer) is formed on a support for image recording material according to the present invention, and examples thereof include, for example, the material used in sublimation-transfer systems in which a thermally diffusive colorant is transferred from an ink layer by heating a sublimation image-receiving medium having an ink layer at least containing a thermally diffusive colorant (sublimation colorant) formed on the support with thermal head.

In the electrophotographic image-receiving material, thermal developing/recording material, sublimation-transfer image-receiving material, thermal-transfer image-receiving material, or silver photographic photosensitive material, at least an image recording layer (toner image-receiving layer, thermal developing layer, image-receiving layer, or photosensitive layer) corresponding to each material is formed on the support for image recording material according to the present invention.

EXAMPLES

The present invention will now be illustrated in greater detail with reference to Examples, but it should be understood that the present invention should not be deemed to be limited thereto. The "part" and "%" in the Examples below mean those by weight, unless specified otherwise, and the "polymerization degree" means a "weight average polymerization degree".

Example 1

Example 1

Preparation of Support

50 Parts of maple Kraft pulp (LBKP) and 50 parts of acacia Kraft pulp (LBKP) were beaten in double-disc refiners, to give respectively pulp slurries having a Canadian freeness (Canadian Standard Freeness) of 330 ml.

Then, 1.3% of cationic starch (CATO304L, manufactured by Japan NSC Co., Ltd.), 0.15% of anionic polyacrylamide (DA4104, manufactured by Seiko PMC Corp.), 0.29% of an alkylketene dimer (Sizepine K, manufactured by Arakawa Kasei Co., Ltd.), 0.29% of an epoxidized behenic acid amide, and 0.32% of polyamide polyamine epichlorohydrin (Arafix 100, manufactured by Arakawa Kasei Co., Ltd.), respectively with respect to the pulp, were added to each of the pulp slurries obtained, and additionally an antifoaming agent in an amount of 0.12% was added thereto.

The pulp slurry in the composition above at a concentration of 1.0% was dewatered at a controlled Jet/Wire ratio (the ratio of stock jet speed to wire speed during papermaking) of 1.00 in a Fourdrinier machine and dried into a base paper having a basis weight of 200 g/m$^2$ and a thickness of 190 μm, giving a base paper.

Specifically, the web was dried at a dryer-canvas tensile force of 1.6 kg/cm in the step of drying the web by pressing the felt face of the web onto the dryer canvas, and subjected to a machine calendering treatment after application of polyvinylalcohol (KL-118, manufactured by Kuraray Co., Ltd.) on both faces of the base paper in an amount of 1 g/m$^2$ in a size press.

The wire face of the base paper obtained (rear face) was subjected to a corona discharge treatment; and high-density polyethylene was coated thereon by using a melt extruder to a thickness of 40 μm, to give a matte-surfaced resin layer (hereinafter, the resin-layer face will be referred to as "rear face"). The surface of the resin layer on the rear face was subjected to a corona discharge treatment additionally; and a dispersion containing aluminum oxide (antistatic agent; alumina sol 100, manufactured by Nissan Chemical Industries Co., Ltd.) and silicon dioxide (Snowtex, manufactured by Nissan Chemical Industries Co., Ltd.) at a weight ratio of 1:2 was coated thereon to have a dry weight of 0.2 g/m$^2$.

The felt face surface (front side) having no resin layer was then subjected to a corona discharge treatment; and low-density polyethylene having an MFR (melt flow rate) of 3.8 containing 10% of anatase titanium dioxide, a trace amount of ultramarine blue (manufactured by Tokyo Printing Ink Mfg. Co., Ltd.), and 0.08% of a fluorescent brightener (Whiteflour PSN conc., manufactured by Nippon Chemical Works Co., Ltd.) (with respect to polyethylene) was extruded thereon to a thickness of 40 μm by using a melt extruder, and pressed at a nip pressure of 3.5 MPa between elastic and cooling rolls, to form a high-gloss thermoplastic resin layer on the base paper support (hereinafter, the high-gloss face will be referred to as "front face"), giving a support (hereinafter, referred to as support A). In the present Example, an ink receiving layer (image recording layer) was formed on the front face in the following manner:

The elastomer for the elastic roll was an ethylene propylene rubber having a hardness of 80, as determined according to JIS K-6301, and a thickness of 25 mm. The surface roughness of the elastic roll, as determined according to JIS B-0601, was 0.3 S.

—Preparation of Coating Solution for Ink Receiving Layer—

A mixture of (a) vapor-phase silica fine particles, (b) ion-exchange water, (c) Sharoll DC-902P, and (d) ZA-30 in the following composition was dispersed in a bead mill KDP (manufactured by Shinmaru Enterprises Corp.), and the dispersion was heated at 45° C. for 20 hours. A mixture of (e) an aqueous boric acid solution, (f) a polyvinylalcohol solution, (g) Hymax SC-505, (h) SUPERFLEX 600, (i) polyoxyethylene laurylether, and (j) ethanol in the following composition was added additionally to the dispersion at 30° C., to give a coating solution for ink receiving layer. The weight ratio of the silica fine particles to the water soluble resin [PB ratio: (a)/(f)] then was 4.9, and the coating solution for ink receiving layer after preparation was acidic at pH 3.9.

<Composition of Coating Solution for Ink Receiving Layer>
  (a) AEROSIL 300S F75—10.0 parts
  [manufactured by Nippon Aerosil Co., Ltd.; vapor-phase silica fine particles (inorganic fine particle), average primary particle diameter: 7 nm]
  (b) Ion-exchange water—64.8 parts
  (c) Sharoll DC-902P (51.5% aqueous solution)—0.87 parts
  [manufactured by Dai-ichi Kogyo Seiyaku Co., Ltd.; dispersant]
  (d) ZA-30 (manufacture by Daiichi Kigenso Kagaku Kogyo Co. Ltd.)—0.54 parts
  (e) Aqueous 6% boric acid (crosslinking agent) solution—6.2 parts
  (f) Polyvinylalcohol (water soluble resin) solution—29.4 parts
  [Composition of solution (f)]
  PVA-235—2.0 parts
  [manufactured by Kuraray Co., Ltd., saponification value: 88%, polymerization degree: 3500]
  Polyoxyethylene laurylether—0.03 parts
  [Emulgen 109P (10% aqueous solution), HLB value: 13.6, manufactured by Kao Corp.; surfactant]
  Following compound 1—0.06 parts
  Diethylene glycol monobutylether—0.68 parts
  [Butycenol 20P, manufactured by Kyowa Hakko chemical Co. Ltd.]
  Ion-exchange water . . . 26.6 parts
  (g) Hymax SC-505 (manufactured by Hymo Co., Ltd.)—0.26 parts
  (h) SUPERFLEX 600 (manufactured by Dai-ichi Kogyo Seiyaku Co., Ltd.)—1.2 parts
  (i) Polyoxyethylene laurylether—0.49 parts
  [Emulgen 109P (10% aqueous solution), HLB value: 13.6, manufactured by Kao Corp.: surfactant]
  (j) Ethanol—2.5 parts

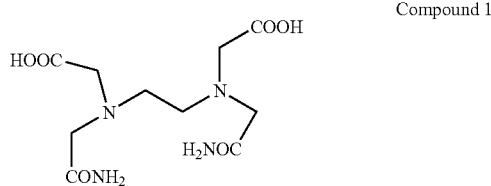

Compound 1

—Preparation of Inkjet Recording Sheet—

After corona discharge treatment of the front face of the support obtained above, the coating solution for ink receiving layer was applied on the front face in an amount of 180 ml/m² with an extrusion die coater, and then, 5-time diluted aqueous polyaluminum chloride solution (polyaluminum chloride used is Alfine 83 (manufactured by Taimei Chemicals Co., Ltd.) was in-line coated thereon at a rate of 10.8 ml/m². Then, the coated film was dried in a hot air dryer at 80° C. (flow rate: 3 to 8 m/sec) to a solid content concentration of 20%. The coated film showed a constant-rate drying then. It was immediately immersed in a mordant solution in the following composition (pH: 7.8) for 10 seconds, allowing the mordant to adhere to the coated film surface in an amount of 15 g/m², and dried at 80° C. for 10 minutes additionally, to give an inkjet recording sheet according to the present invention (1) having an ink receiving layer having a dry layer thickness of 32 μm.

<Composition of Mordant Solution>
  (a) Boric acid (crosslinking agent)—0.65 parts
  (b) Zircosol AC-7—2.5 parts
  [manufactured by Daiichi Kigenso Kagaku Kogyo Co. Ltd.; zirconium ammonium carbonate]
  (c) Ammonium carbonate (Reagent grade, manufactured by Kanto Chemical Co. Inc.)—3.5 parts
  (d) Ion-exchange water—63.3 parts
  (e) Polyoxyethylene laurylether (surfactant)—30.0 parts
  [Emulgen 109P (2% aqueous solution), HLB value: 13.6, manufactured by Kao Corp.]

Example 2

A support B and an inkjet recording sheet thereof according to the present invention (2) were prepared in a similar manner to Example 1, except that 50 parts of maple Kraft pulp and 50 parts of acacia Kraft pulp used in "Preparation of support A" of Example 1 were replaced with 90 parts of maple Kraft pulp and 10 parts of acacia Kraft pulp.

Example 3

A support C and an inkjet recording sheet thereof according to the present invention (3) were prepared in a similar manner to Example 1, except that the Canadian freeness after beating in the double-disc refiner in "Preparation of support A" of Example 1 was changed from 330 ml to 280 ml.

Example 4

A support D and an inkjet recording sheet thereof according to the present invention (4) were prepared in a similar manner to Example 1, except that the thickness of the thermoplastic resin layer on "front face" in "Preparation of support A" of Example 1 was changed from 40 μm to 50 μm.

Example 5

A support E and an inkjet recording sheet thereof according to the present invention (5) were prepared in a similar manner to Example 1, except that the nip pressure between elastic and cooling rolls in "Preparation of support A" of Example 1 was changed from 3.5 MPa to 2 MPa.

Example 6

A support K and an inkjet recording sheet thereof according to the present invention (11) were prepared in a similar manner to Example 1, except that 50 parts of maple Kraft pulp and 50 parts of acacia Kraft pulp used in "Preparation of support A" of Example 1 were replaced with 70 parts of maple Kraft pulp and 30 parts of acacia Kraft pulp.

Example 7

A support L and an inkjet recording sheet thereof according to the present invention (12) were prepared in a similar manner to Example 6, except that the pulp slurry concentration in "Preparation of support K" of Example 6 was changed from 1.0% to 1.3%.

Example 8

A support M and an inkjet recording sheet thereof according to the present invention (13) were prepared in a similar manner to Example 6, except that the pulp slurry concentration in "Preparation of support K" of Example 6 was changed from 1.0% to 0.6%.

Example 9

A support N and an inkjet recording sheet thereof according to the present invention (14) were prepared in a similar manner to Example 6, except that the Jet/Wire ratio in "Preparation of support K" of Example 6 was changed from 1.00 to 1.15.

Example 10

A support O and an inkjet recording sheet thereof according to the present invention (15) were prepared in a similar manner to Example 6, except that the Jet/Wire ratio in "Preparation of support K" of Example 6 was changed from 1.00 to 0.80.

Comparative Example 1

A support F and an inkjet recording sheet thereof according to the present invention (6) for comparison were prepared in a similar manner to Example 1, except that the Canadian freeness after beating in the double-disc refiner in "Preparation of support A" of Example 1 was changed from 330 ml to 150 ml.

Comparative Example 2

A support G and an inkjet recording sheet thereof according to the present invention (7) for comparison were prepared in a similar manner to Example 1, except that the Canadian freeness after beating in the double-disc refiner in "Preparation of support A" of Example 1 was changed from 330 ml to 450 ml.

Comparative Example 3

A support H and an inkjet recording sheet thereof according to the present invention (8) were prepared in a similar manner to Example 1, except that 50 parts of maple Kraft pulp and 50 parts of acacia Kraft pulp used in "Preparation of support A" of Example 1 were replaced with 50 parts of acacia Kraft pulp and 50 parts of aspen Kraft pulp.

Comparative Example 4

A support I and an inkjet recording sheet thereof according to the present invention (9) were prepared in a similar manner to Example 1, except that the thickness of the thermoplastic resin layer on the "front face" formed in "Preparation of support A" of Example 1 was changed from 40 μm to 30 μm.

Comparative Example 5

A support J and an inkjet recording sheet thereof according to the present invention (10) were prepared in a similar manner to Example 1, except that 50 parts of maple Kraft pulp and 50 parts of acacia Kraft pulp used in "Preparation of support A" of Example 1 were replaced with 20 parts of maple Kraft pulp and 80 parts of acacia Kraft pulp.

Comparative Example 6

A support P and an inkjet recording sheet thereof according to the present invention (16) were prepared in a similar manner to Example 6, except that the pulp slurry concentration in "Preparation of support K" of Example 6 was changed from 1.0% to 1.4%.

Comparative Example 7

A support Q and an inkjet recording sheet thereof according to the present invention (17) were prepared in a similar manner to Example 6, except that the pulp slurry concentration in "Preparation of support K" of Example 6 was changed from 1.0% to 0.5%.

Comparative Example 8

A support R and an inkjet recording sheet thereof according to the present invention (18) were prepared in a similar manner to Example 6, except that the Jet/Wire ratio in "Preparation of support K" of Example 6 was changed from 1.00 to 1.20.

Comparative Example 9

A support S and an inkjet recording sheet thereof according to the present invention (19) were prepared in a similar manner to Example 6, except that the Jet/Wire ratio in "Preparation of support K" of Example 6 was changed from 1.00 to 0.70.

(Evaluation)

Each of the base papers and the inkjet recording sheets according to the present invention made of the base papers obtained in the Examples and Comparative Examples above (1) to (5) and (11) to (15) and each of the inkjet recording sheets for comparison (6) to (10) and (16) to (19) was evaluated in the following tests. Results are summarized in the following Table 1.

1. Formation (Index)

Each of the base papers obtained in the Examples and Comparative Examples above was analyzed by using a 3D sheet analyzer M/K950 manufactured by M/K Systems, Inc. (MKS) with a diaphragm of the analyzer having a diameter of 1.5 mm and by using a formation tester (MFT). A higher formation index obtained by the analyzer indicates more favorable formation.

2. Center Surface Average Roughness (SRa Value)

The center surface average roughnesses (SRa values) were determined according to the following methods (1) and (2):

(1) The center surface average roughness (SRa value) of each base paper obtained in the Examples and Comparative Examples above was determined by using a three-dimensional surface structure-analyzing microscope (ZYGO New View 5000, manufactured by ZYGO Co., Ltd.) under the following measurement/analysis condition in a cut-off range of 0.05 mm to 0.5 mm.

<Measurement/Analysis Condition>
Measurement length: X direction: 10 mm, and Y direction: 10 mm
Object lens: 2.5-time magnification
Band pass filter: 0.05 mm to 0.5 mm (2) The center surface average roughness (SRa value) of each base paper obtained in the Examples and Comparative Examples above was determined by using a surface-shape analyzer Nanometro 110F (manufactured by Kuroda Precision Industries Co., Ltd.) under the following measurement/analysis condition in a cut-off range of 1 mm to 3 mm.

<Measurement/Analysis Condition>
Scanning direction: MD direction of sample
Measurement length: X direction: 50 mm, and Y direction: 30 mm
Measurement pitch: X direction: 0.01 mm, and Y direction: 1.0 mm
Scanning rate: 2 mm/sec
Band pass filter: 1 mm to 3 mm 3. Image Clarity (Glossiness)

A black (K) painted image was printed on each of the inkjet recording sheets (1) to (19) by using an inkjet printer (PM-G800, manufactured by Seiko Epson Corporation) under the following image recording condition, giving a test sample.

<Image Recording Condition>
Printing data: RGB digital value (8 bit), 0, 0, 0
Printing settings
  Paper kind: EPSON photographic paper
  Color: color
  Mode setting: recommended setting, clear
Drying condition before measurement of image clarity and regular reflection-light intensity: dried in an environment at 23° C. and 50% RH for one day.

Then, the image clarity C of the painted image region on each inkjet recording sheet was determined by using an image clarity meter ICM-1 (manufactured by Suga Test Instrument Co., Ltd.) according to the image clarity test method specified by JIS H8686-2 under the following measurement/analysis condition:

<Measurement/Analysis Condition>
Measuring method: reflection
Measurement angle: 60°
Optical comb: 2.0 mm, 1.0 mm, or 0.5 mm 4. Image Quality Each of the inkjet recording sheets (1) to (19) was filled in an inkjet printer (PM-G800, manufactured by Seiko Epson Corporation), and figure and landscape images were printed on the inkjet recording sheet and evaluated by visual observation according to the following criteria.

[Evaluation Criteria]
A: Photograph-like image favorable in image quality
B: Almost photograph-like image mostly favorable in image quality
C: Unsatisfactory photograph-like image, but favorable in image quality
D: Normal image quality

TABLE 1

| | Base Paper | | | | | Support Thickness of the Thermoplastic Resin Layer on the front side [μm] | Inkjet Recording Sheets | | | |
|---|---|---|---|---|---|---|---|---|---|---|
| | Pulp Slurry | | | Surface Roughness SRa [μm] | | | | Image Clarity C Value (Glossiness) [%] | | |
| | Concentration [%] | Ratio of J/W | Formation Index | Cut Off 0.05~0.5 mm | Cut Off 1~3 mm | Nip Pressure [MPa] | | Comb Width 2 mm | Comb Width 1 mm | Comb Width 0.5 mm | Image Quality |
| Example 1 | 1.0 | 1.00 | 73 | 0.55 | 0.59 | 3.5 | 40 | 92 | 57 | 11 | B |
| Example 2 | 1.0 | 1.00 | 87 | 0.65 | 0.52 | 3.5 | 40 | 92 | 59 | 15 | B |
| Example 3 | 1.0 | 1.00 | 90 | 0.50 | 0.58 | 3.5 | 40 | 91 | 57 | 18 | B |
| Example 4 | 1.0 | 1.00 | 73 | 0.55 | 0.59 | 3.5 | 50 | 97 | 68 | 21 | A |
| Example 5 | 1.0 | 1.00 | 73 | 0.55 | 0.59 | 2 | 40 | 82 | 45 | 7 | B |
| Example 6 | 1.0 | 1.00 | 84 | 0.59 | 0.55 | 3.5 | 40 | 92 | 59 | 14 | B |
| Example 7 | 1.3 | 1.00 | 62 | 0.68 | 0.72 | 3.5 | 40 | 81 | 33 | 7 | B |
| Example 8 | 0.6 | 1.00 | 71 | 0.54 | 0.61 | 3.5 | 40 | 86 | 48 | 13 | B |
| Example 9 | 1.0 | 1.15 | 64 | 0.66 | 0.59 | 3.5 | 40 | 82 | 39 | 11 | B |
| Example 10 | 1.0 | 0.80 | 63 | 0.68 | 0.63 | 3.5 | 40 | 82 | 36 | 10 | B |
| Comparative 1 | 1.0 | 1.00 | 55 | 0.49 | 0.62 | 3.5 | 40 | 78 | 14 | 6 | C |
| Comparative 2 | 1.0 | 1.00 | 57 | 0.76 | 0.65 | 3.5 | 40 | 77 | 12 | 2 | C |
| Comparative 3 | 1.0 | 1.00 | 80 | 0.90 | 0.85 | 3.5 | 40 | 65 | 10 | 2 | D |
| Comparative 4 | 1.0 | 1.00 | 73 | 0.55 | 0.59 | 3.5 | 30 | 73 | 12 | 2 | D |
| Comparative 5 | 1.0 | 1.00 | 57 | 0.61 | 0.59 | 3.5 | 40 | 79 | 13 | 6 | C |
| Comparative 6 | 1.4 | 1.00 | 51 | 0.74 | 0.84 | 3.5 | 40 | 66 | 12 | 2 | D |
| Comparative 7 | 0.5 | 1.00 | 58 | 0.55 | 0.81 | 3.5 | 40 | 76 | 21 | 6 | C |

TABLE 1-continued

| | Base Paper | | | | | Support Thickness of the Thermoplastic Resin Layer | Inkjet Recording Sheets | | | |
|---|---|---|---|---|---|---|---|---|---|---|
| | Pulp Slurry | | | Surface Roughness SRa [µm] | | | Image Clarity C Value (Glossiness) [%] | | | |
| | Concentration [%] | Ratio of J/W | Formation Index | Cut Off 0.05~0.5 mm | Cut Off 1~3 mm | Nip Pressure [MPa] | on the front side [µm] | Comb Width 2 mm | Comb Width 1 mm | Comb Width 0.5 mm | Image Quality |
| Comparative 8 | 1.0 | 1.20 | 55 | 0.72 | 0.77 | 3.5 | 40 | 77 | 18 | 4 | C |
| Comparative 9 | 1.0 | 0.70 | 57 | 0.72 | 0.70 | 3.5 | 40 | 77 | 19 | 4 | C |

As shown in Table 1 above, it was possible to form an high-quality image superior in glossiness and photographic feel, in the Examples wherein the formation index, surface roughness SRa and thickness of the base paper satisfy the ranges specified by the present invention. In contrast, it was not possible to obtain an image having favorable glossiness and photographic feel on the base paper obtained in the Comparative Examples.

The invention claimed is:

1. A support for image recording material, comprising a base paper and thermoplastic resin layers formed on both faces of the base paper, wherein:
   a formation index of the base paper is 60 or more;
   a surface of the base paper, at least on a side where an image recording layer is formed, has a center surface average roughness SRa of 0.70 µm or less when measured with a cut-off condition of within the range of 0.05 to 0.5 mm, and a center surface average roughness SRa of 0.80 µm or less when measured with a cut-off condition of within the range of 1 to 3 mm; and
   the thickness of the thermoplastic resin layer, at least on the side where the image recording layer is formed, is 35 to 60 µm.

2. A support for image recording material according to claim 1, wherein the thermoplastic resin layer on the side where an image recording layer is formed is laminated by melt-extruding a polyolefin resin onto the base paper and then feeding the base paper between an elastic roll and a cooling roll at a nip pressure of 2 MPa or more.

3. An image recording material comprising the support for image recording material according to claim 1 and an image recording layer which is formed at least on one face of the support for image recording material.

4. The image recording material according to claim 3, wherein the image recording layer is an ink receiving layer for receiving inkjet recording ink.

5. The image recording material according to claim 4, wherein the ink receiving layer contains fine particles, a water soluble resin, a crosslinking agent that can crosslink the water soluble resin, and a mordant.

6. The image recording material according to claim 5, wherein:
   the water soluble resin is at least one kind selected from the group consisting of polyvinylalcohol resins, cellulosic resins, ether bond-containing resins, carbamoyl group-containing resins, carboxyl group-containing resins, and gelatins; and
   the fine particles are at least one kind selected from the group consisting of silica fine particles, colloidal silica fine particles, alumina fine particles, and pseudoboehmite fine particles.

7. The image recording material according to claim 4, wherein:
   the ink receiving layer is a layer obtained by crosslinking and hardening a coating layer formed by coating a coating solution containing at least fine particles and a water soluble resin; and
   the crosslinking and hardening is performed by adding a crosslinking agent to the coating solution and/or a basic solution having pH of 7.1 or more and applying the basic solution onto the coating layer during the following period (1) or (2),
   (1) simultaneously with the coating of the coating solution to form the coated layer, or
   (2) during drying of the coated layer before the coated layer exhibits a reduced rate of drying.

* * * * *